(12) United States Patent
Jain et al.

(10) Patent No.: US 11,087,310 B2
(45) Date of Patent: Aug. 10, 2021

(54) METHOD AND SYSTEM FOR FACILITATING RECURRING CUSTOMER PAYMENT TO MERCHANTS

(71) Applicant: MASTERCARD INTERNATIONAL INCORPORATED, Purchase, NY (US)

(72) Inventors: Vairag Jain, Uttar Pradesh (IN); Mayank Prakash, Uttarakhand (IN); Satya Sudipta Padhiary, Maharashtra (IN)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 0 days.

(21) Appl. No.: 16/543,098

(22) Filed: Aug. 16, 2019

(65) Prior Publication Data

US 2020/0065796 A1 Feb. 27, 2020

(30) Foreign Application Priority Data

Aug. 21, 2018 (SG) .......................... 10201807095X

(51) Int. Cl.
*G06Q 20/32* (2012.01)
*G06K 19/06* (2006.01)

(52) U.S. Cl.
CPC ... *G06Q 20/3276* (2013.01); *G06K 19/06037* (2013.01)

(58) Field of Classification Search
CPC .............. G06Q 20/3276; G06Q 40/00; G06K 19/06037
USPC ...................................................... 705/40, 35
See application file for complete search history.

(56) References Cited

U.S. PATENT DOCUMENTS

| 7,035,872 | B2 | 4/2006 | Phillips |
| 7,974,873 | B2 | 7/2011 | Simmons |
| 8,566,235 | B2 | 10/2013 | Katz |
| 8,583,512 | B1 | 11/2013 | Gupta |
| 9,258,691 | B2 | 2/2016 | Lee |
| 9,519,928 | B2 | 12/2016 | Calman |
| 10,621,589 | B2* | 4/2020 | Jaffe ................ G06Q 20/3823 |
| 2009/0171839 | A1* | 7/2009 | Rosano ................ G06Q 20/12 705/40 |

(Continued)

FOREIGN PATENT DOCUMENTS

JP 2009080528 A * 4/2009

*Primary Examiner* — Narayanswamy Subramanian
*Assistant Examiner* — Timothy T. Hsieh
(74) *Attorney, Agent, or Firm* — Armstrong Teasdale LLP

(57) ABSTRACT

A method and server system for facilitating recurring customer payments to merchants are provided. A Quick Response (QR) code including a Standing Instruction (SI) flag is generated. The SI flag is capable of offering customers of a merchant with an option to pay for respective recurring payments using SI. The generated QR code is provided by the merchant to at least one customer. A first payment from among a set of recurring payments from a customer to the merchant is processed based on an input related to the SI provided by the customer subsequent to a selection of the option in the QR code by the customer. A unique identifier associated with a processing of the first payment from the customer to the merchant is generated and stored. Each subsequent payment is processed using the unique identifier and the input related to the SI.

18 Claims, 12 Drawing Sheets

(56) References Cited

U.S. PATENT DOCUMENTS

| | | | |
|---|---|---|---|
| 2013/0346302 A1* | 12/2013 | Purves | G06Q 20/108 705/40 |
| 2014/0108236 A1* | 4/2014 | Purves | G06Q 20/108 705/39 |
| 2016/0300220 A1* | 10/2016 | Sethi | G06Q 20/322 |

* cited by examiner

METHOD AND SYSTEM FOR FACILITATING RECURRING CUSTOMER PAYMENT TO MERCHANTS

CROSS REFERENCE TO RELATED APPLICATIONS

This patent application claims priority to Singapore Patent Application No. 10201807095X filed on Aug. 21, 2018, the disclosure of which is incorporated by reference herein in its entirety as part of the present application.

BACKGROUND

The present disclosure generally relates to customer payments to merchants for goods or services purchased from the merchants and, more particularly to, a method and system for facilitating recurring customer payments to merchants.

Several merchants provide goods or offer services, which by nature, are consumed by their customers on a frequent basis, and as such, the customers engage in multiple purchase transactions with the merchants and settle bills at periodic intervals. In an illustrative example, a user (i.e., a customer) may purchase milk from a milk vendor (i.e., a merchant) on a daily basis. Accordingly, the user may have to settle bills with the milk vendor either on a daily, weekly, or a monthly basis. In another illustrative example, a user may purchase newspaper from a newspaper vendor on a daily basis. Again, in such a situation, the user may have to settle the bills with the newspaper vendor either on a daily, weekly, or a monthly basis. In yet another illustrative example, a user may have to pay rent to a rental property owner every month.

The bills of merchants such as the milk vendor, the newspaper vendor, the rental property owner, and the like, are typically settled by the customers in a manual manner. More specifically, the customers pay the merchants for each recurring purchase transaction either by cash or by online transfer of funds from the customer's payment account to the merchant's payment account. The manual repetitive manner of making recurring payments may be cumbersome for the customers. Moreover, in case of cash transactions, the merchants may also have to generate paper invoices and physically collect the payments at regular intervals, which may be inconvenient for the merchants.

Accordingly, there is a need to facilitate recurring customer payments to the merchants, while precluding cumbersome periodic manual transfer of funds from the customers to the merchants.

BRIEF DESCRIPTION

Various embodiments of the present disclosure provide methods and systems for facilitating recurring customer payments to merchants.

An embodiment of the present disclosure provides a method for facilitating recurring customer payments to merchants. The method includes causing, by a server system associated with a payment network, a generation of a Quick Response (QR) code including a Standing Instruction (SI) flag capable of offering customers of a merchant with an option to pay for respective recurring payments using SI. The generated QR code is provided by the merchant to at least one customer. A first payment from among a set of recurring payments from a customer to the merchant is processed based on an input related to the SI provided by the customer subsequent to a selection of the option in the QR code by the customer. The method includes storing, by the server system, a unique identifier associated with a processing of the first payment from the customer to the merchant. The method includes facilitating, by the server system, processing of each subsequent payment from among the set of recurring payments using the unique identifier and the input related to the SI.

Another embodiment of the present disclosure provides a server system configured to facilitate recurring customer payments to merchants. The server system includes a memory including stored instructions and at least one processor communicably coupled to the memory. The processor is configured to execute the stored instructions to cause the server system to perform a generation of a machine-readable code including a Standing Instruction (SI) flag capable of offering customers of a merchant with an option to pay for respective recurring payments using SI. The generated machine-readable code is provided by the merchant to at least one customer. A first payment from among a set of recurring payments from a customer to the merchant is processed based on an input related to the SI provided by the customer subsequent to a selection of the option in the machine-readable code by the customer. The server system is caused to store a unique identifier associated with a processing of the first payment from the customer to the merchant. The server system is caused to facilitate processing of each subsequent payment from among the set of recurring payments using the unique identifier and the input related to the SI.

An embodiment of the present disclosure provides another method for facilitating recurring customer payments to merchants. The method includes generating, by an acquirer server, a Quick Response (QR) code including a Standing Instruction (SI) flag capable of offering customers of a merchant with an option to pay for respective recurring payments using SI. The generated QR code is provided by the merchant to at least one customer. A first payment from among a set of recurring payments from a customer to the merchant is processed based on an input related to the SI provided by the customer subsequent to a selection of the option in the QR code by the customer. The method includes storing, by the acquirer server, a unique identifier associated with a processing of the first payment from the customer to the merchant. The method includes receiving by the acquirer server on onset of a date associated with each subsequent payment from among the set of recurring payments, a message from the merchant for initiating the corresponding subsequent payment. The message includes the unique identifier. The method includes providing, by the acquirer server, the message to an issuing bank associated with a customer payment account to facilitate processing of each subsequent payment. Each subsequent payment from among the set of recurring payments is processed using the unique identifier and the input related to the SI.

BRIEF DESCRIPTION OF THE DRAWINGS

For a more complete understanding of example embodiments of the present technology, reference is now made to the following descriptions taken in connection with the accompanying drawings in which.

Figure 1:
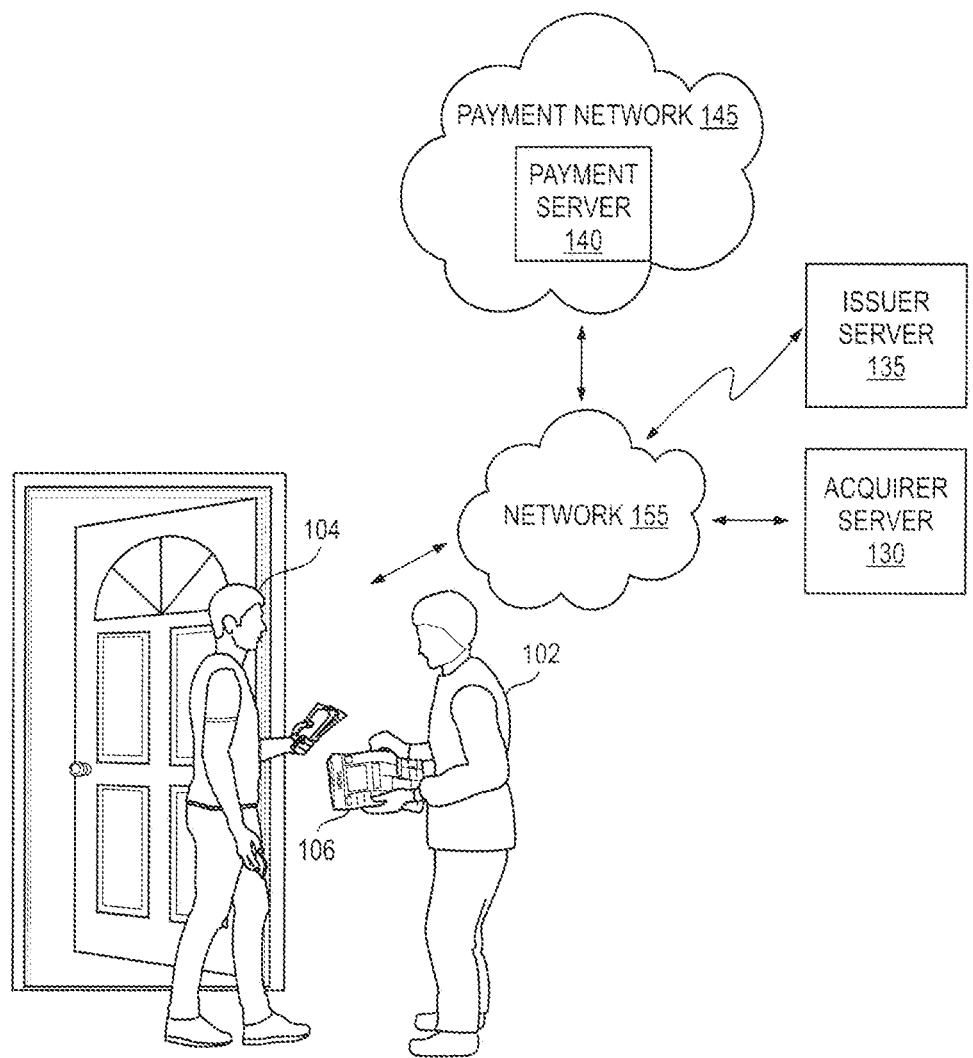
FIG. 1 shows a representation for illustrating an example customer purchase transaction from a merchant, in accordance with an example embodiment of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The term "payment account" used throughout the description refers to a financial account that is used to fund the financial transaction (interchangeably referred to as "payment transaction"). Examples of the payment account include, but are not limited to a savings account, a credit account, a checking account, and a virtual payment account. The payment account may be associated with an entity such as an individual person, a family, a commercial entity such as a merchant, a company, a corporation, a governmental entity, a non-profit organization, and the like. In some scenarios, a payment account may be a virtual or temporary payment account that can be mapped or linked to a primary payment account, such as those accounts managed by PayPal®, and the like.

The term "payment network", used throughout the description, refers to a network or collection of systems used for transfer of funds through use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, financial accounts, etc. Examples of networks or systems configured to perform as payment networks include those operated by Mastercard®, VISA®, Discover®, American Express®, etc.

The term "payment card", used throughout the description, refers to a physical or virtual card linked with a financial or payment account that may be used to fund a financial transaction to a merchant or any such facility via the associated payment account. Examples of the payment card include, but are not limited to, debit cards, credit cards, prepaid cards, virtual payment numbers, virtual card numbers, forex cards, charge cards, and stored-value cards. A payment card may be a physical card that may be presented to the merchant for funding the payment. Alternatively, or additionally, the payment card may be embodied in the form of data stored in a user device, where the data is associated with payment account such that the data can be used to process the financial transaction between the payment account and a merchant's financial account.

Overview

Various example embodiments of the present disclosure provide a method and a system for facilitating recurring customer payments to the merchants. More specifically, various embodiments as disclosed herein enable merchants, especially small merchants, to provide an option to their customers to pay for recurring payments using a Standing Instruction (SI). It is noted that the term 'Standing instruction' as used throughout the description refers to a banking instruction capable of facilitating an automatic repetitive payment of a fixed/variable amount to a loan, bill, credit card, subscription, or any other payment on a certain frequency (monthly, weekly, etc.).

In one embodiment, a merchant uses an application or an online/Web portal to request a machine-readable code, such as a Quick Response (QR) code. The application or the portal may be associated with a merchant bank or may be provided by a payment network entity, such as a payment server associated with a payment network. In response to the request, the application/portal is configured to offer a choice to the merchant to include a Standing Instruction (SI) flag in the machine-readable code. If the merchant accepts the choice, then the application/portal is configured to request the merchant to choose at least one frequency of scheduling recurring payments to be offered to the customers. For example, the merchant may wish to offer weekly or monthly payment options to the customers. Accordingly, the merchant may choose the weekly or monthly frequency of scheduling recurring payments from the customers. Subsequent to a receipt of a merchant input related to the frequency, the application/portal is configured to generate the machine-readable code (for example, a QR code) including the SI flag.

In at least one embodiment, the merchant provides the generated machine-readable code to existing and potential users of products or services offered by the merchant. More specifically, the merchant provides the machine-readable code to the customers. In an illustrative example, the merchant may include the generated machine-readable code in purchase transaction bills provided to the customers. For example, the merchant may download the machine-readable code generated by the application/portal and print the machine-readable code on the purchase transaction bills to be provided to the customers. The SI flag in the machine-readable code is configured to provide an option to customers to pay the merchant for respective recurring payments using the SI.

In one embodiment, a customer may access the machine-readable code by scanning the machine-readable code using an application. The application may be associated with a customer bank or may be provided by a payment server associated with a payment network. In at least one example embodiment, scanning of the machine-readable code by the customer is configured to cause a provisioning of the option to the customer to pay the merchant using the SI. The customer selection of the option to pay the merchant using the SI is configured to cause provisioning of a request to the customer to provide the input related to the SI. In one embodiment, the input related to the SI includes a date for debiting a customer payment account for each payment subsequent to a first payment and an end date for the SI. More specifically, subsequent to the selection of the option to pay the merchant for recurring payments using SI, the customer may be requested to input a date on which the customer payment account is to be debited and also an end date for the SI. For example, the customer may provide an input indicative of a request to debit the customer payment account on the $5^{th}$ of every month and to end the SI by December $31^{st}$ of the same year. It is noted that the end date and the date of debit determines a number of recurring payments to be made to the merchant. For example, if a current date (i.e., the date on which the customer is providing the input related to the SI) is the $15^{th}$ of May, and the customer has chosen to debit the customer payment account on the $5^{th}$ of every month till the $31^{st}$ of December of the same year, then the number of recurring payments configuring the set of recurring payments is eight (i.e., a first payment on the $15^{th}$ of May and a recurring payment on the $5^{th}$ of each month from June to December). The customer may further be requested to provide information related to the customer payment account to be debited in relation to the recurring payments to the merchant.

In some embodiments, a customer authentication is performed subsequent to the providing the input related to the SI by the customer. A successful authentication may facilitate processing of a first payment from the customer to the merchant based on the input related to the SI. The authentication may be performed by an issuing bank associated with the customer payment account. The issuing bank may first validate the purchase transaction, i.e. check if sufficient balance is available in the customer payment account to cover the first payment. Thereafter, upon successful authentication, the issuing bank may be configured to debit the customer payment account. The issuing bank, also referred to herein as the issuer, may be configured to use a payment network (i.e., communicate with a payment server) to notify the merchant bank of the successful processing of the first payment and the transfer of funds to a merchant account.

In an embodiment, the issuer may also generate a unique identifier corresponding to the processing of the first payment. The unique identifier is configured to facilitate each subsequent payment from among the set of recurring payments from the customer to the merchant. In at least some embodiments, the issuer provides the unique identifier along with the information associated with the SI related input to the merchant bank via the payment server. The merchant bank may be configured to store the unique identifier associated with the first payment and also provide the unique identifier to the merchant.

In one embodiment, the merchant provides a message including the unique identifier to the merchant bank for initiating each payment subsequent to the first payment. In some embodiments, the message from the merchant may also include a purchase transaction amount associated with the respective recurring payment. For example, in some scenarios, the recurring payment may involve minor variance (such as for example, in case of a missed daily purchase or increased consumption in a particular period). In such a scenario, the inclusion of the purchase amount in the message provides the flexibility to charge the customer payment account without affecting the SI from the customer. The merchant bank may be configured to provide the message to the issuer associated with the customer payment account to facilitate the processing of each payment subsequent to the first payment.

In some embodiments, the authentication of the customer for the first payment may involve seeking customer permission for processing each subsequent recurring payment from among the set of recurring payments based on the authentication for the first payment. Accordingly, subsequent recurring payments may preclude customer authentication and the customer payment account may directly be debited as per the input related to the SI. The facilitation of recurring customer payments to the merchant is further explained in detail hereinafter with reference to FIGS. 1 to 12.

FIG. 1 shows a representation 100 for illustrating an example customer purchase transaction from a merchant, in accordance with an example embodiment of the present disclosure. More specifically, the representation 100 depicts a newspaper delivery personnel 102 delivering a newspaper 106 to a user 104 at a user's doorstep. The newspaper delivery personnel 102 may be delivering a newspaper daily to the user 104. The user 104 may settle the bill for regular purchase of newspapers at periodic intervals, for example, on the $1^{st}$ of every month. In FIG. 1, the user 104 is depicted to be paying in cash for the purchase transaction (i.e., the purchase of newspapers for a month). As such, the user 104 is a customer who is involved in regular purchase transactions with the newspaper delivery personnel 102, who serves as the merchant providing a newspaper delivery service to the user 104. For the purposes of the description, the newspaper delivery personnel 102 is referred to hereinafter as a merchant 102 and the user 104 is referred to hereinafter as a customer 104. It is understood that the newspaper delivery personnel 102 may be in the employ of a newspaper vendor and may deliver newspapers and collect bill settlements on behalf of the newspaper vendor. It is also noted that the representation 100 shown in FIG. 1 is illustrative of a customer purchase transaction, which is recurring with a scheduled frequency, and the present disclosure may not be limited to such a customer purchase transaction. Indeed, customers, such as the customer 104, may be engaged in recurring payment transactions with several merchants, who provide goods or offer services, which are, by nature, consumed on a frequent basis. For example, a customer may purchase milk from a milk vendor on a daily basis. In yet another illustrative example, a customer may pay mortgage or a credit card bill with a scheduled frequency. Typically, the customers pay for such recurring payment transactions using manual means. One such manual means is depicted in the form of exchange of cash for the newspapers delivered in that month in FIG. 1. In some cases, the customers may manually execute electronic transfer of funds from a customer's payment account to the merchant's payment account for each recurring payment transaction.

In some embodiments, a merchant may maintain a portable payment card reader to extend digital means of payment to the customers instead of exchanging cash for purchase transactions. For example, the newspaper delivery personnel 102 (i.e., the merchant 102) may carry the portable card reader (not shown in FIG. 1) to the customers' doorsteps. The user 104 (i.e., the customer 104) may swipe or insert a payment card (for example, a credit card or a debit card) in the portable card reader to initiate a payment transaction. It is noted that in some embodiments, instead of the portable card reader, the merchant 102 may also provide an online merchant interface such as a merchant Website, a mobile or desktop application or a third-party Website or application using which the customer 104 may purchase goods or service from a remote location or with in-store presence.

It is noted that the portable card reader may serve as a Point-of-Sale (POS) terminal. The customer 104 may have to enter a personal identification number (PIN) using the portable card reader. Alternatively, in the embodiment of the merchant interface being the online merchant interface, the customer 104 may enter payment card details using an electronic device, such as for example his personal computer or a mobile phone or any other electronic device while purchasing an item online from the merchant Website. Some non-exhaustive examples of payment card details entered using the electronic device include payment card number, date of expiry, Card Verification Value (CVV) details, and the like.

In a non-limiting example, authorization of the customer's bank account with sufficient funds for making a transaction of 'X' amount to complete the payment transaction is performed by a combination of an acquirer server 130, an issuer server 135, and a payment server 140. In one embodiment, the payment server 140 is associated with a payment network 145. The payment network 145 may be used by payment cards issuing authorities as a payment interchange network. Examples of payment interchange network include, but not limited to, Mastercard® payment system interchange network. The Mastercard® payment system interchange network is a proprietary communications standard promulgated by Mastercard International Incorporated® for the exchange of financial transaction data between financial institutions that are members of Mastercard International Incorporated®. (Mastercard is a registered trademark of Mastercard International Incorporated located in Purchase, N.Y.).

The issuer server 135 is associated with a financial institution normally called as an "issuer bank" or "issuing bank" or simply "issuer", in which the customer 104 may have an account, which issues a payment card, such as a credit card or a debit card. The customer 104, being the cardholder, can use the payment card details associated with the payment card to tender payment for a purchase from the merchant 102.

To accept payment, the merchant 102 must normally establish an account with a financial institution that is part of the financial payment system. This financial institution is usually called the "merchant bank" or the "acquiring bank" or "acquirer bank" or simply "acquirer". The acquirer server 130 is associated with the acquirer bank.

Using the payment network 145, the computers of the acquirer/the acquirer server 130 or the merchant processor will communicate with the computers of the issuer/the issuer server 135 to determine whether the customer's account is in good standing and whether the purchase is covered by the customer's available account balance. Based on these determinations, authorization of the payment transaction is declined or accepted. When the authorization is accepted, the available balance of the customer's account is decreased. Normally, a charge is not posted immediately to the customer's account because bankcard associations, such as Mastercard International Incorporated®, have promulgated rules that do not allow a merchant to charge, or "capture," a transaction until goods are shipped or services are delivered. When the merchant 102 ships or delivers the goods or services, the merchant 102 captures the transaction by, for example, appropriate data entry procedures on the portable card reader. If the customer 104 cancels a transaction before it is captured, a "void" is generated. If the customer 104 returns goods after the transaction has been captured, a "credit" is generated.

After a transaction is captured, the transaction is settled between the merchant 102, the acquirer and the issuer. Settlement refers to the transfer of financial data or funds between the merchant's account, the acquirer, and the issuer, related to the transaction. Usually, transactions are captured and accumulated into a "batch", which is settled as a group.

A customer device (e.g., a mobile phone or desktop computer of the customer 104), the merchant device (e.g., the portable card reader) associated with the merchant interface, the issuer server 135, the acquirer server 130, and the payment server 140 communicate with one another using a network 155. Examples of the network 155 may include any type of wired network, wireless network, or a combination of wired and wireless networks. A wireless network may be a wireless local area network ("WLAN"), a wireless wide area network ("WWAN"), or any other type of wireless network now known or later developed. Additionally, the network 155 may be or include the Internet, intranets, extranets, microwave networks, satellite communications, cellular systems, personal communication services ("PCS"), infrared communications, global area networks, or other suitable networks, etc., or any combination of two or more such networks.

As explained above, the customers typically pay the merchants for each recurring purchase transaction either by cash or by electronic transfer of funds from the customer's payment account to the merchant's payment account. The manual repetitive manner of making recurring payments may be cumbersome for the customers. Moreover, in case of cash transactions, the merchants may also have to generate paper invoices and physically collect the payments at regular intervals, which may be inconvenient for the merchants.

Further, the merchants currently have no mechanism or way to accept payments via Standing Instructions (SI) for face to face transactions. For online transactions, the SI option is limited/restricted to credit cards only and not provided for debit/prepaid cards. Furthermore, small Merchants also are not able to opt for the SI option even for online transactions. Accordingly, there is a need to facilitate recurring customer payments to the merchants, while precluding cumbersome periodic manual transfer of funds from the customers to the merchants.

Various embodiments of the present disclosure provide mechanisms that facilitate recurring customer payments to the merchants. More specifically, various embodiments as disclosed herein enable merchants, especially small merchants, to provide an option to their customers to pay for recurring payments using a Standing Instruction (SI). An SI flag is included within a machine-readable code (for example, a QR code, a barcode, and the like) and presented to a customer on a purchase transaction bill. The customer may scan the machine-readable code and opt for SI to pay for recurring payments to the merchant. The inclusion of the SI option within the machine-readable code saves the customer the hassle of manually transferring funds for each recurring purchase transaction. Moreover, the merchant is saved the inconvenience of maintaining portable card readers or physically collecting cash for recurring purchase transactions. For purposes of this description, the various embodiments of the present disclosure are explained using the machine-readable code embodied as a Quick Response (QR) code. It is noted that the usage of machine-readable code may not be limited to only QR codes and that the machine-readable code may include other codes, such as the barcode for example.

Figure 2:
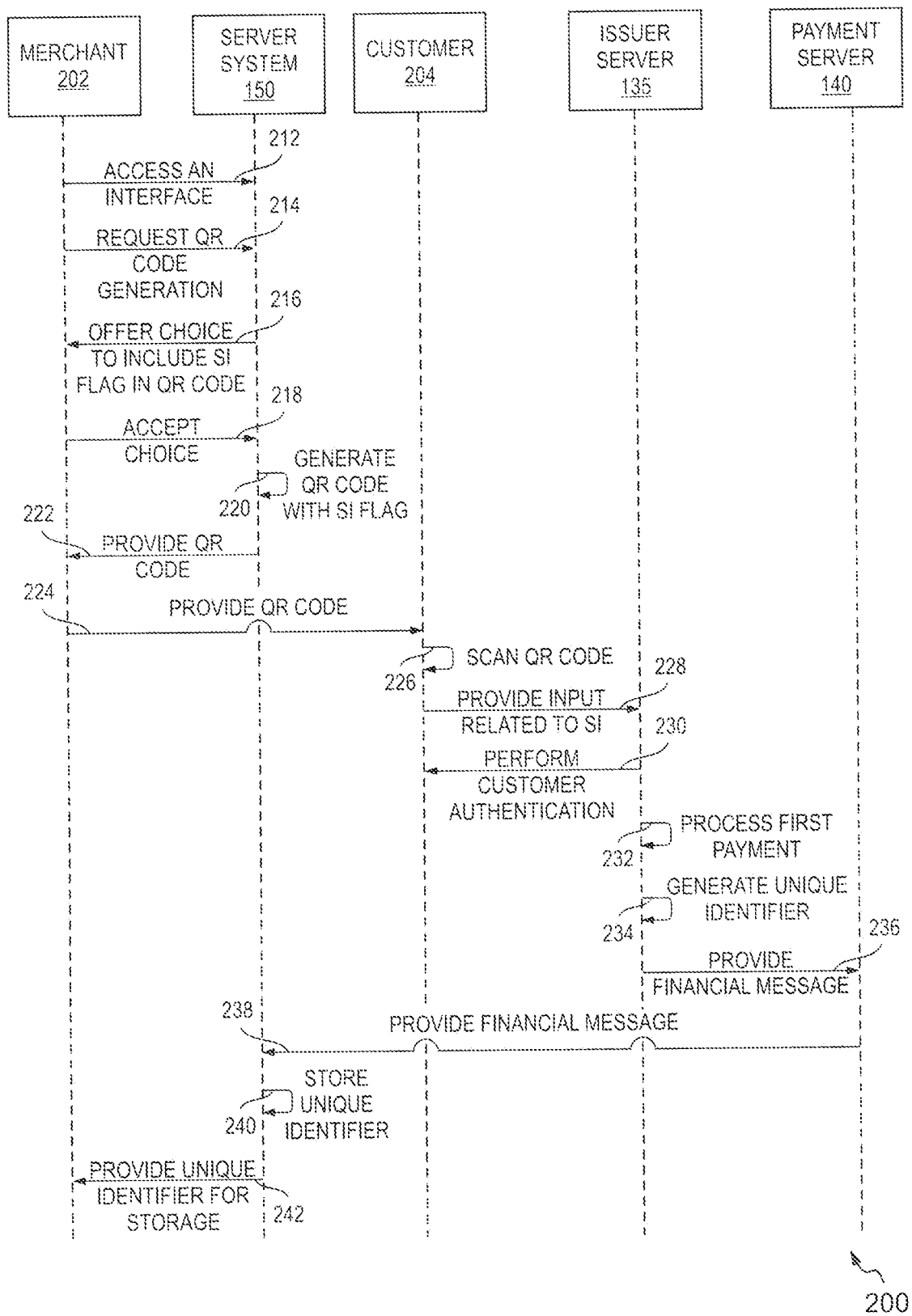
FIG. 2 represents a sequence flow diagram for illustrating a facilitating of a first payment from among a set of recurring payments from a customer to a merchant, in accordance with an example embodiment of the present disclosure.

FIG. 2 represents a sequence flow diagram 200 for illustrating a facilitating of a first payment from among a set of recurring payments from a customer to a merchant, in accordance with an example embodiment of the present disclosure.

The set of recurring payments (including the first payment) is facilitated by a server system 150 associated with a payment network. In FIG. 2, the server system 150 corresponds to an acquirer server, such as the acquirer server 130 explained with reference to FIG. 1. Accordingly, the server system 150 may be associated with a merchant bank, i.e. an acquirer. In some embodiments, the server system 150 may also correspond to the payment server 140 associated with the payment network 145 shown in FIG. 1. In some example scenarios, the issuer server 135, the acquirer server 130, and the payment server 140 can be a single entity, or any two of these servers may be a single entity, configuring the server system 150. The terms 'server system', 'server' or 'system' are used interchangeably hereinafter.

The merchant bank may provide an application or an online/Web interface to all merchants maintaining an account with the merchant bank using the acquirer server 130, which is depicted as the server system 150 herein. The sequence flow diagram 200 starts at 212.

At 212, a merchant 202 (such as the merchant 102 explained with reference to FIG. 1) accesses an interface provided by the server system 150. The interface may correspond to an application interface or an online/Web portal interface associated with the server system 150.

At 214, the merchant 202 provides a request to generate a Quick Response (QR) code on the interface associated with the server system 150.

At 216, the server system 150 provides a choice to the merchant 202 to include a Standing Instruction (SI) flag in the QR code.

At 218, the merchant 202 provides an acceptance of the choice to include the SI flag in the QR code and also provides a selection of at least one frequency of scheduling recurring payments (for example, monthly frequency) to be offered to the customers.

At 220, the server system 150 generates the QR code including the SI flag. An illustrative example of a string associated with the generated QR code including a SI flag is depicted below:

000201010212021640062510002383080415510096100023830061661 00520000238306082312345678912 3IFSC 12345675204411253033565406275.57580 2IN5918 DAWN NEWSPAPERLTDBHARATQR6006Mumbai 61061100026245051620000376164201010708000238301002SI1103MON63048EB1

The string includes a tag 62, which is associated with a string portion '1002SI1103MON' (shown as highlighted in the above string). As all data in the QR string is stored in Tag-Length-Value (TLV) format, the string elements '10', '02' and 'SI' in the first part of the string portion, i.e. in '1002SI', indicate a sub-tag of tag 62, i.e. sub-tag #10 of length '2' and value 'SI' indicative of the Standing Instruction (SI) transaction option, respectively. Similarly, the string elements '11', '03' and 'MON' in the second part of the string portion, i.e. in '1103MON', indicate a sub-tag of tag 62, i.e. sub-tag #11 of length '3' and value 'MON' indicative of a 'MONTHLY' Standing Instruction (SI) frequency, respectively. It is to be noted that the QR code including the SI flag may not be limited to the example string shown above. Indeed, the QR string and the inclusion of the SI flag may be formulated in various other ways.

At 222, the server system 150 provides the generated QR code including the SI flag to the merchant 202.

At 224, the merchant 202 provides the QR code to a customer 204. In one embodiment, the merchant 202 may print the QR code on a purchase transaction bill and provide the bill to the customer 204. Alternatively, the merchant 202 may also provide the QR code over a messaging medium, such as Short Message Service (SMS) medium or a chat medium to the customer 204.

At 226, the customer 204 scans the QR code to avail a digital means of payment to the merchant 202. In one embodiment, an electronic device associated with the customer 204 may include an application provided by a customer bank, i.e. a bank maintaining a customer payment account. The customer payment account may further be associated with a payment card capable of being used for payment transactions, such as for making recurring payments to the merchants. Accordingly, the customer 204 may use the application provided by the customer bank (hereinafter referred to as an issuer) to scan the QR code. In at least one embodiment, the customer 204 may be provided with an option by the application to make payment to the merchant 202 using a SI option. In response to the selection of the option by the customer 204, the SI flag in the QR code may be configured to cause the application to request the customer 204 to provide an input related to the SI. For example, the customer 204 may be requested to select a date for debiting a customer payment account for each subsequent payment (i.e., payment subsequent to the first payment) and an end date for the SI. The customer 204 may also be requested to provide information related to the customer payment account as part of the input related to the SI. At 228, the customer 204 provides the input related to the SI to the application, which is configured to provide the information to a server system associated with the issuer, i.e. the issuer server 135. More specifically, the SI flag as well as the input related to the SI is provided to the issuer server 135 by the customer 204.

At 230, the issuer server 135 performs an authentication of the customer 204. More specifically, the issuer server 135 is configured to validate the purchase transaction, i.e. check if the information provided by the customer 204 matches with entries stored corresponding to the customer 204 in a local repository and if sufficient balance is available in the customer payment account to cover the first payment. Thereafter, the issuer server 135 may use any 3D Secure (3DS) means, such as a One-Time-Password (OTP), for authenticating the customer 204.

In some embodiments, the authentication of the customer 204 for the first payment may involve seeking customer permission for processing each subsequent payment from among the set of recurring payments based on the authentication for the first payment. Accordingly, subsequent recurring payments may preclude customer authentication and the customer payment account may directly be debited as per the input related to the SI.

Subsequent to successful authentication at 230, the issuer server 135 debits the customer payment account to process the first payment at 232.

At 234, the issuer server 135 generates a unique identifier associated with the processing of the first payment.

At 236, the issuer server 135 notifies the payment server 140 of the successful processing of the first payment using the payment network 145 shown in FIG. 1. The issuer server 135 also provides the unique identifier and the SI flag to the payment server 140. In at least some embodiments, the issuer server 135 may configure a financial message in form of an ISO 0200 message and include the SI flag and the unique identifier in the message. The financial message may also include information related to purchase transaction amount, the date of debiting the customer payment account and the end date of the SI. The financial message may then be provided to the payment server 140 at 236.

At 238, the payment server 140 provides the financial message to the server system 150 (i.e., the acquirer server 130) in relation to the successful processing of the first payment. In some embodiments, the financial message received by the payment server 140 may include a merchant primary account number (PAN), and the payment server 140 may be configured to identify the merchant bank based on the merchant PAN in the message. The payment server 140 may then be configured to provide the financial message to the server system 150 based on the identification of the merchant 202. The financial message provided to the server system 150 by the payment server 140 also includes the unique identifier and the SI flag. In some embodiments, the payment server 140 stores a copy of the unique identifier and the information related to the first payment in an associated database storing customer and merchant related information.

Upon receipt of the financial message from the payment server 140, the server system 150, at 240, the server system 150 recognizes the transaction as a SI transaction based on the SI flag. Further, the server system 150 checks the merchant profile to determine whether the merchant 202 is valid or not and whether the merchant 202 is accepting the credit. Based on merchant validity, the server system 150 may provide a successful response to the payment server 140. The server system 150 also stores a copy of the unique identifier and the information related to the SI flag.

At 242, the server system 150 includes the SI flag and unique identifier information with other SI related information into an API/ISO message and provides the financial message to the merchant 202 for storage. The unique identifier enables the merchant 202 to initiate subsequent recurring payments from the customer 204 as will be explained in detail later. The sequence flow diagram 200 ends at 242.

In at least one example embodiment, upon onset of a date associated with each scheduled subsequent payment from among the set of recurring payments, the merchant 202 may provide a non-financial message including the unique identifier to the server system 150 for initiating the processing of a respective scheduled payment. In some embodiments, the non-financial message from the merchant 202 may also include a purchase transaction amount associated with the respective scheduled payment. The server system 150 may be configured to provide the non-financial message to the issuer server 135 associated with the issuer (i.e., bank maintaining the customer payment account) to facilitate processing of each recurring payment subsequent to the first payment.

As explained above, in response to a request from a merchant to generate a QR code, the interface (for example, an application interface or a Web/online interface) provides a choice to include a SI flag in the QR code. An example User Interface (UI) provided to a merchant is shown in FIG. 3.

Figure 3:
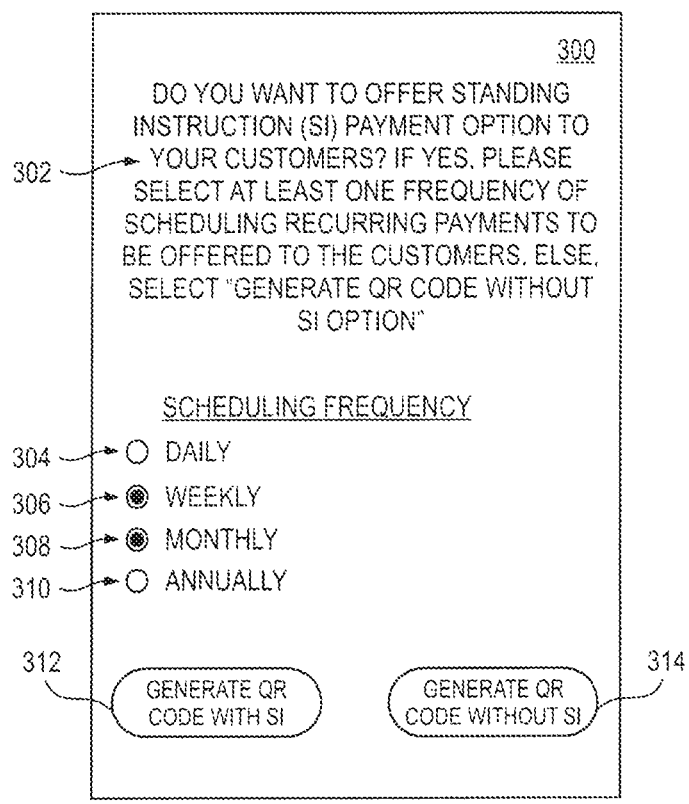
FIG. 3 shows an example UI for illustrating a provisioning of a choice to a merchant to include a SI flag in the QR code, in accordance with an example embodiment of the present disclosure.

Referring now to FIG. 3, an example UI 300 is shown for illustrating a provisioning of a choice to a merchant to include a SI flag in a QR code, in accordance with an example embodiment of the present disclosure. As explained with reference to FIGS. 1 and 2, a merchant may sell goods or offer services, which are consumed on a frequent basis by the customers and as such entail recurring payment transactions from the customers. The merchant wishing to offer digital means of payment to the customer may access an application, an online portal or a Website associated with a server system associated with a payment network, such as the server system 150 explained with reference to FIG. 2, to request generation of a QR code. As explained, the server system 150 may correspond to server associated with a merchant bank (for example, the acquirer server 130) or the server system 150 may correspond to the payment server (for example, the payment server 140 associated with payment interchange network like the Mastercard payment system interchange network), which in conjunction with the merchant bank provides an application or a Web interface to its customers (i.e., the merchants) for executing various banking tasks including, but not limited to, generating the QR code.

Accordingly, in response to the merchant's request to generate QR code, a UI such as the UI 300 may be displayed to the customer on a display screen of the device used for accessing the application. The UI 300 is depicted to display a text snippet 302 associated with text:

"DO YOU WANT TO OFFER STANDING INSTRUCTION (SI) PAYMENT OPTION TO YOUR CUSTOMERS? IF YES, PLEASE SELECT AT LEAST ONE FREQUENCY OF SCHEDULING RECURRING PAYMENTS TO BE OFFERED TO THE CUSTOMERS. ELSE, SELECT "GENERATE QR CODE WITHOUT SI OPTION""

The UI 300 further depicts four options associated with frequency of scheduling payments. More specifically, the UI 300 depicts options 304, 306, 308, and 310 associated with text 'DAILY', 'WEEKLY', 'MONTHLY', and 'ANNUALLY', respectively. Each option is associated with a radio button capable of being selected (either by a click or a touch input). The merchant may provide a selection of one or more options from among the options 304-310. In an illustrative example, the merchant may provide an input for selecting options 306 and 308. In such a situation, the generated QR code may include a SI flag which is capable of offering weekly and monthly payment options to the customers of the merchant.

The UI 300 further depicts two buttons 312 and 314 associated with text 'GENERATE QR CODE WITH SI' and 'GENERATE QR CODE WITHOUT SI', respectively. The merchant may provide a selection input related to the button 312 to provide an acceptance of the choice to include a SI flag in the QR code. Alternatively, the merchant may skip providing an input related to any of the options 304-310 and provide a selection input related to the button 314 to generate the QR code without the SI flag. In response, to the selection of the button 312, the application may be configured to generate the QR code with the SI flag. The merchant may provide the QR code to the customers to offer the customers with an option to pay for recurring payments using SI. For example, the merchant may print the QR code on each purchase transaction bill and present the bills to respective customers. One such provisioning of the QR code to a customer is shown in FIG. 4.

Figure 4:
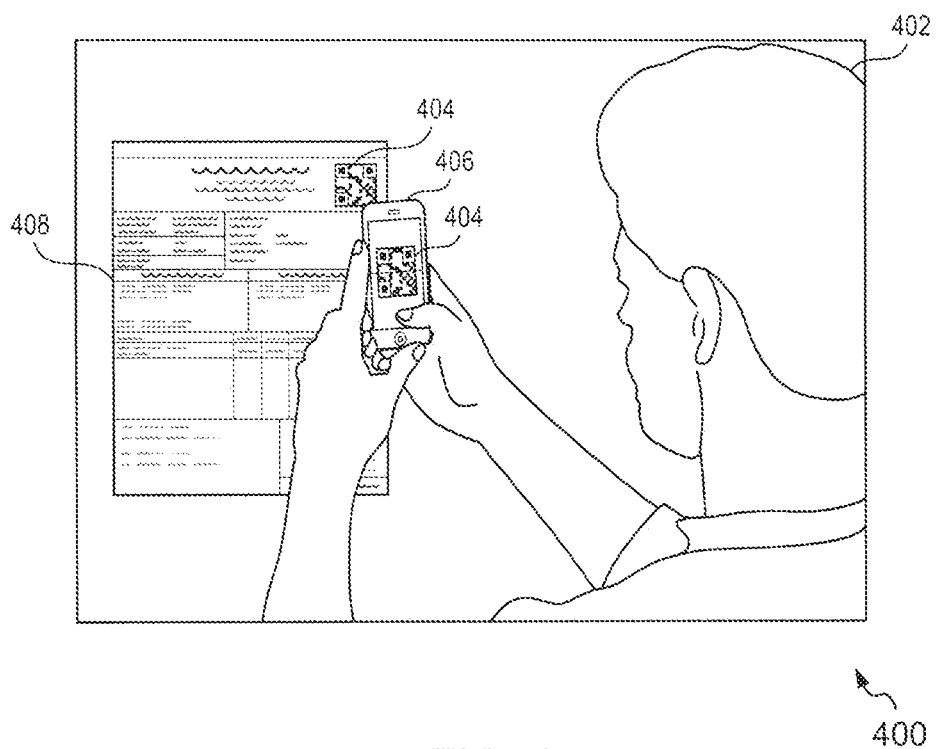
FIG. 4 shows a representation of a customer scanning a QR code using a personal electronic device for illustrating the provisioning of the option to pay the merchant using SI, in accordance with an example embodiment of the present disclosure.

FIG. 4 shows a representation 400 of a customer 402 scanning a QR code 404 using a personal electronic device 406 for illustrating the provisioning of the option to pay the merchant using SI, in accordance with an example embodiment of the present disclosure. As explained with reference to FIG. 3, the server system 150 (i.e., the application/Web interface associated with the server system) facilitates generation of a QR code including the SI flag by providing an application or online/Web interface. The merchant may provide the QR code to the customers to offer the customers with an option to pay for recurring payments using SI. For example, the merchant may print the QR code on each purchase transaction bill and present the bills to respective customers. Alternatively, the merchant may provide the QR code over a chat message or using SMS, while the purchase transaction bill may be delivered physically or via Email to the customers. In FIG. 4, the customer 402 is depicted to have received a physical copy of a purchase transaction bill 408. Moreover, the purchase transaction bill 408 is depicted to bear the QR code 404. The customer 402 may use the personal electronic device 406 (exemplarily depicted to be smartphone) to scan the QR code 404. In at least one example embodiment, the customer 402 may have installed an application associated with a customer bank (also referred to herein as the issuer) in the personal electronic device 406. The customer 402 may use the application associated with the issuer to scan the QR code 404.

In some embodiments, the server system 150 may be embodied as the payment server 140 associated with the payment network 145. The payment server 140 may create an application to generate and/or scan the QR code. Several banking institutions (such as the merchant bank, the customer bank, and the like) may configure their respective computing systems (i.e., the acquirer servers and the issuer servers) to be in operable communication with the payment server 140 and offer the application interface to their respective customers to generate QR code and/or scan the QR code through their respective banking interfaces.

The scanning of the QR code 404 may cause provisioning of another UI associated with the issuer. The UI associated with issuer is configured to provide the option to the customer 402 to pay the merchant using SI. An example UI associated with the issuer provided to the customer 402 is shown in FIG. 5A.

Figure 5A:
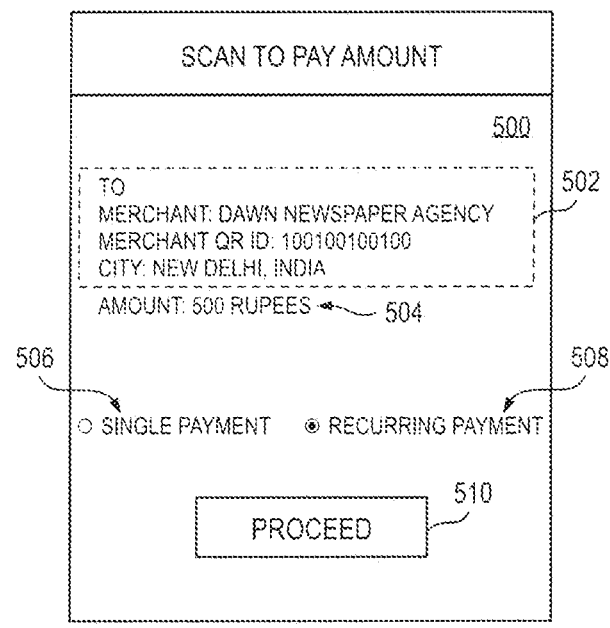
FIG. 5A shows an example UI for illustrating a provisioning of an option to the customer to pay the merchant for recurring payments using SI, in accordance with an example embodiment of the present disclosure.

FIG. 5A shows an example UI 500 for illustrating a provisioning of an option to the customer 402 (shown in FIG. 4) to pay the merchant for recurring payments using SI, in accordance with an example embodiment of the present disclosure. As shown in FIG. 4, the customer 402 scans the QR code 404 provided by the merchant to pay using digital means (i.e., pay using a payment card such as a credit card or a debit card). On scanning the QR code 404, the customer 402 may be displayed a UI, such as the UI 500.

The UI 500 is depicted to display a payee information section 502 including the information related to the merchant, such as for example, an identity of the merchant (exemplarily depicted to 'DAWN NEWSPAPER AGENCY'), a merchant QR ID (exemplary depicted to be 100100100100) and a city associated with the merchant (exemplarily depicted to be 'NEW DELHI, INDIA'). The UI 500 is also configured to depict an amount 504 associated with the purchase transaction. The amount 504 is exemplarily depicted to be 500 RUPEES.

The UI 500 is further depicted to display two options 506 and 508 associated with text 'SINGLE PAYMENT' and 'RECURRING PAYMENT', respectively. Each option is associated with a radio button capable of receiving an input (for example, a touch input or a click input) from the customer 402 indicative of selection of the respective option by the customer 402. It is noted that the provisioning of options using radio buttons is shown herein for illustration purposes and it is understood that the UI 500 may provide the options such as the option 506 and 508 in several different ways, such as for example by using a form field with a drop-down menu, and the like.

The option 508 displayed on the UI 500 corresponds to the option to pay the merchant for recurring payments using SI. In an example scenario, the customer 402 may choose to make recurring payments to the merchant and accordingly, may provide a selection of the option 508 and thereafter select a button 510 associated with the text 'PROCEED'. In an embodiment, the selection of the option to pay the merchant for recurring payments, i.e. the selection of the option 508 may cause provisioning of another UI configured to request the customer 402 to provide input related to the SI. One such example UI is shown in FIG. 5B.

Figure 5B:
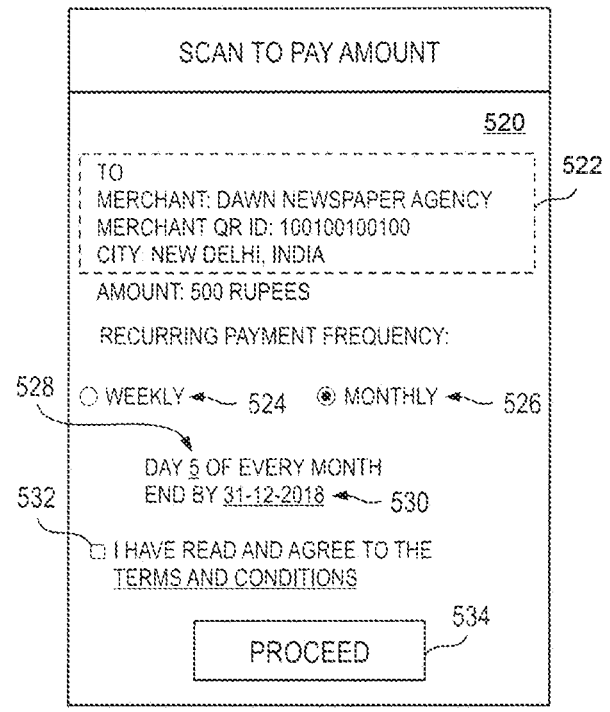
FIG. 5B shows a UI for illustrating a provisioning of a customer input related to the SI, in accordance with an example embodiment of the present disclosure.

Referring now to FIG. 5B, a UI 520 is shown for illustrating a provisioning of a customer input related to the SI, in accordance with an example embodiment of the present disclosure. The UI 520 may be displayed to the customer 402 on the customer's personal electronic device 406 (shown in FIG. 4) subsequent to the selection of the option to pay the merchant for recurring payments, i.e. the selection of the option 508 on the UI 500 shown in FIG. 5A.

The UI 520 is depicted to include a payee information section 522. The payee information section 522 includes content similar to the content included in the payee information section 502 explained with reference to FIG. 5A and is not explained again herein.

The UI 520 is further depicted to display options 524 and 526 associated with text 'WEEKLY' and 'MONTHLY', respectively, for providing the customer 402 with options to select a frequency of scheduling recurring payments. Each option is depicted to be associated with a radio button capable of receiving selection input from the customer 402. The customer 402 is exemplarily depicted to have selected the option 526 associated with the monthly payment option. The UI 520 also displays an option 528 for selecting a date for debiting a customer payment date, and an option 530 for selecting an end date for the SI (i.e., an end date for making recurring payments to the merchant).

As an example, the customer 402 is depicted to have provided an input indicative of a request to debit the customer payment account on the $5^{th}$ of every month and to end the SI by the $31^{st}$ December of 2018. It is noted that the end date and the date of debit determines a number of recurring payments to be made to the merchant. For example, if a current date (i.e., the date on which the customer is providing the input related to the SI) is the $15^{th}$ of May, and the customer 402 has chosen to debit the customer payment account on the $5^{th}$ of every month till the $31^{st}$ December of 2018, then the number of recurring payments configuring the set of recurring payments is eight (i.e., the first payment and a recurring payment on the $5^{th}$ of each month from June to December).

The customer 402 may be requested to provide an acceptance of the terms and conditions by selecting a check box 532 to confirm the input related to the SI and also approve the various terms and conditions for debiting the customer payment account as per the input related to the SI. In one embodiment, the terms and conditions may include a condition to use the customer authenticated credentials used for a first payment to the merchant, to be also used for subsequent recurring payments. Thereby, the customer involvement in authentication for subsequent debiting of the customer payment account to pay for recurring payments to the merchant may be skipped. Accordingly, the customer input related to the check box 532 may provide a customer approval of the input related to the SI and also of the various terms and conditions for debiting the customer payment account as per the input related to the SI. Accordingly, the customer 402 may provide a selection input in relation to the check box 532 and thereafter select a button 534 (exemplarily depicted to be associated with the text 'PROCEED') to provide the input related to the SI to the customer bank, or, more specifically, to the issuer server associated with the issuer (i.e., the customer bank)

In response to the selection of the button 534, the customer 402 may be presented with a UI configured to request the customer 402 to provide information related to the customer payment account that is to be debited in relation to the recurring payments to the merchant. One such example UI displayed to the customer 402 is shown in FIG. 5C.

Figure 5C:
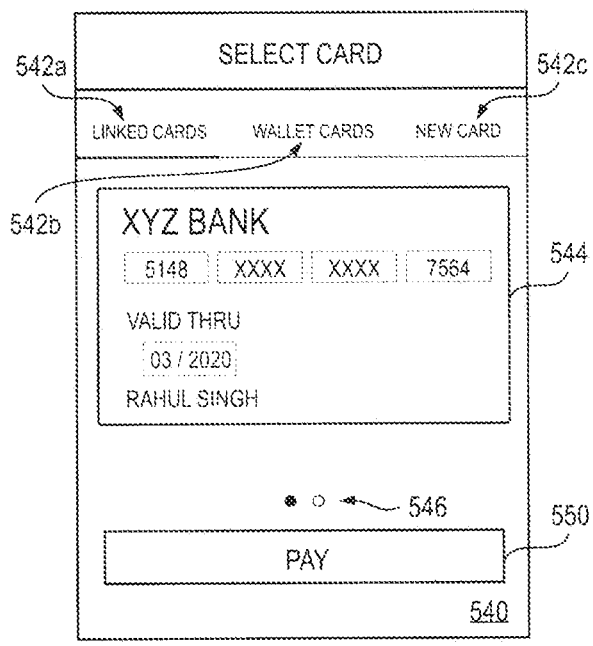
FIG. 5C shows a UI for illustrating a provisioning of information related to a customer payment account to be used to pay the merchant for recurring payments, in accordance with an example embodiment of the present disclosure.

Referring now to FIG. 5C, a UI 540 is shown for illustrating a provisioning of information related to a customer payment account to be used to pay the merchant for recurring payments, in accordance with an example embodiment of the present disclosure. The UI 540 may be presented to the customer 402 in response to the customer selection of the button 534 shown in FIG. 5B.

As explained with reference to FIGS. 5A and 5B, the customer 402 may use an application associated with the issuer maintaining the customer payment account to scan the QR code 404. The scanning of the QR code 404 may cause provisioning of a UI, such as the UI 520, configured to request SI related information from the customer 402. Further, as part of the input related to the SI, the customer 402 may also be requested to provide customer payment account information. As the application scanning the QR code 404 is associated with the customer's bank, which also maintains the customer payment account, the application may be configured to retrieve one or more payment cards associated with the customer's payment account. Accordingly, the UI 540 is depicted to display a menu section showing menu options 542a, 542b, and 542c associated with text 'LINKED CARDS', 'WALLET CARDS', and 'NEW CARD'. The menu option 542a is depicted to be selected and an image, such as the image 544 associated with a payment card of the customer 402 is depicted to be displayed on the UI 540. More specifically, the UI 540 is depicted to display an image of a payment card linked with the customer payment account. If the customer 402 wishes to select another payment card, then the customer 402 may retrieve payment cards in the customer's wallet account by selecting the menu option 542b or add a new payment card by selecting the menu option 542c.

The image 544 of the payment card is configured to display the payment card details, such as the name of the customer on the payment card, the payment card number, the name of the bank, and the payment card expiry details. The UI 540 also displays an indication 546 suggestive of an option to access another payment card linked with the customer's payment account being accessible by swiping from right to the left or by navigating right of the UI 540. The UI 540 further depicts a button 550 associated with the text 'PAY'. The customer 402 may provide a touch or a click input on the button 550 to provide a selection of the payment card displayed as the image 544 as the payment account to be used for debiting recurring payments to be paid to the merchant. Alternatively, the customer 402 may swipe to the right to view an image of another linked payment card and thereafter select a button similar to the button 550 to select another linked payment card as the payment account to be used for debiting recurring payments to be paid to the merchant.

It is noted that the information associated with the payment card, such as the customer name, the payment card number, and the payment card expiry details may be chosen as the information related to the customer payment account. It is noted that the information related to the customer payment amount configures a part of the input related to the SI, in addition, to the date of debiting the customer payment account and the end date related to the SI.

Further, it is noted the provisioning of the information related to the customer payment card is explained with reference to a selection of a payment card for illustration purposes. In some embodiments, the UI 540 may include a plurality of form fields capable of receiving text as well as selection input for receiving the payment card details from the customer 402.

In some embodiments, a customer authentication is performed subsequent to the providing of the input related to the SI by the customer 402. In one embodiment, the customer authentication may be performed using One-Time-Password (OTP) or any such 3DS means subsequent to the selection of the button 550 associated with the text 'PAY' by the customer 402. A successful authentication may facilitate processing of a first payment from the customer 402 to the merchant based on the input related to the SI. It is noted that the authentication may be performed by an issuing bank associated with the customer payment account. The issuing bank may first validate the purchase transaction, i.e., check if sufficient balance is available in the customer payment account to cover the first payment. Thereafter, upon successful authentication, the issuing bank may be configured to debit the customer payment account. The issuing bank, also referred to herein as the issuer, may be configured to use a payment network (i.e., communicate with a payment server) to notify the merchant bank of the successful processing of the first payment and the transfer of funds to a merchant account.

Figure 5D:
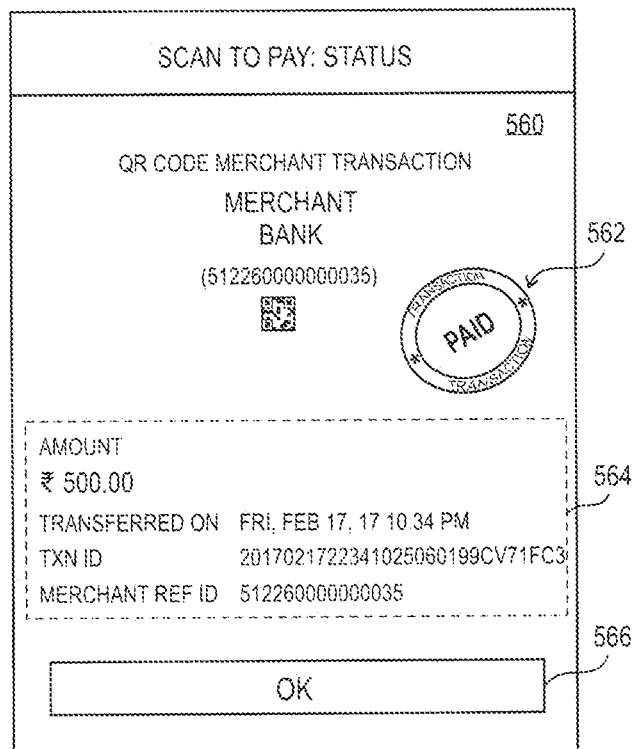
FIG. 5D shows a UI displayed to the customer subsequent to the successful processing of the first payment, in accordance with an example embodiment of the present disclosure.

An example UI provided to the customer 402 subsequent to the successful processing of the first payment is shown in FIG. 5D.

Referring now to FIG. 5D, a UI 560 displayed to the customer subsequent to the successful processing of the first payment is shown, in accordance with an example embodiment of the present disclosure. As explained with reference to FIGS. 5B and 5C, the customer 402 may provide an input related to the SI (i.e., the customer payment account information, the date of debiting the customer payment account, and end date of the SI) and thereafter select the button 550 to provide the information to the issuer server associated with the customer bank (i.e., the issuer). The issuer server may authenticate the customer 402 and process the purchase transaction. Subsequent to the successful processing of the purchase transaction, a UI such as the UI 560, may be displayed to the customer 402 on the display screen of the customer's personal electronic device 406 (shown in FIG. 4). The UI 560 is depicted to display an image 562 indicative of the successful processing of the purchase transaction. The UI 560 also depicts the transaction information as depicted in a transaction information section 564. More specifically, the transaction information section 564 is depicted to display information such as the transaction amount, the transaction date and time, the transaction ID, and the merchant ID. The UI 560 further depicts a button 566 associated with the text 'OK'. The customer 402 may provide a selection input on the button 566 to confirm the receipt of the successful processing of the first payment.

In at least some embodiments, the issuer server generates a unique identifier corresponding to the first payment and packages the payment related information corresponding to the SI in form ISO 0200 message. In ISO 0200 message specification, there are several defined data elements. For example, data element (DE) #2 corresponds to customer primary account number (PAN), DE #4 corresponds to the transaction amount, DE #18 corresponds to merchant type, and so on and so forth. The DE #108 within the ISO 0200 message specification may be used for packaging the SI related information with a sub-element SE3 corresponding to SI data. Accordingly, the issuer server may generate a financial message including five data elements with each data element including an information parameter. The data elements included within the financial message are shown in FIG. 5E.

Figure 5E:
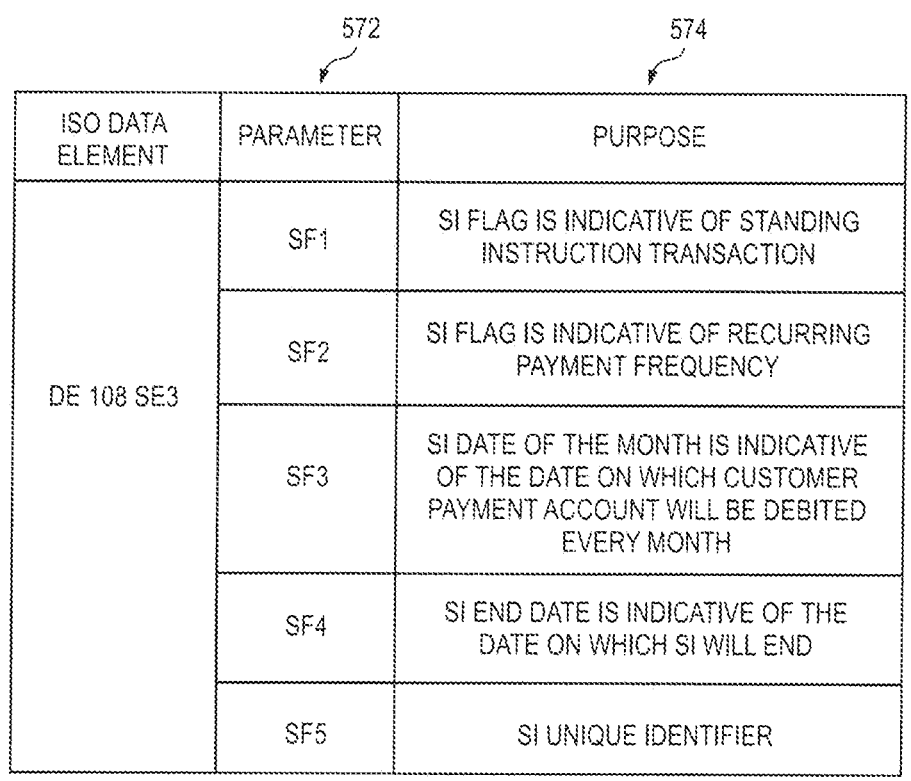
FIG. 5E is a table showing information parameters associated with a data element used for packaging SI related information in a financial message, in accordance with an example embodiment of the present disclosure.

Referring now to FIG. 5E, a table 570 showing information parameters associated with a data element used for packaging the SI related information in a financial message, in accordance with an example embodiment of the present disclosure. As explained with reference to FIG. 5D, the issuer server generates a unique identifier corresponding to the first payment and packages the payment related information corresponding to the SI in form ISO 0200 message. In at least one embodiment, the data element (DE) #108 with sub-element #SE3 may be used for packaging the SI related information.

The ISO data element DE 108 SE3 is associated with five information parameters, as shown in column 572 of the table 570. More specifically, the ISO data element DE 108 SE3 is associated with information parameters SF1, SF2, SF3, SF4, and SF5, respectively. Each information parameter is configured to include information indicative of a particular purpose (as depicted by entries in column 574 corresponding to each entry in the column 572). For example, information parameter SF1 represents a SI Flag indicative of the corresponding transaction being a standing instruction. The SI Flag can assume 'SI' or 'RE' value. The information parameter SF2 represents a SI Frequency indicative of a recurring payment frequency. The SI Frequency can assume daily, weekly, monthly, quarterly, or yearly frequency value. The information parameter SF3 represents a SI Date of the month indicative of the date on which customer payment account will be debited every month. The information parameter SF4 represents a SI End Date indicative of the date on which SI will end. The information parameter SF5 represents a SI Unique identifier.

Accordingly, the issuer server generates a financial message of the form: DE 108 SE3 SF1-SF5 corresponding to the first payment and provides the financial message to the merchant bank via the payment server 140. The merchant bank may be configured to store the unique identifier associated with the first payment. Further, the merchant bank (using the acquirer server 130 or using the application or Web interface) may notify the merchant of the successful processing of the first payment and also provide the unique identifier to the merchant.

As explained with reference to FIG. 2, on the onset of the date associated with the scheduled next recurring payment, the merchant may provide a non-financial message including the unique identifier to the merchant bank (for example, by using the application provided by the merchant bank) for initiating the processing of the next recurring payment. In some embodiments, the message from the merchant may also include a purchase transaction amount associated with the respective recurring payment. For example, in some scenarios, the recurring payment may involve minor variance (such as for example, in case of missed daily purchase or increased consumption in a particular period). In such a scenario, the inclusion of the purchase amount in the non-financial message provides the flexibility to charge the customer payment account without affecting the SI from the customer. The merchant bank may be configured to provide the non-financial message to the issuer associated with the customer payment account to facilitate processing of the next recurring payment subsequent to the first payment.

Further as explained with reference to FIG. 5C, the authentication of the customer 402 for the first payment may involve seeking customer permission for processing each subsequent recurring payment from among the set of recurring payments based on the authentication for the first payment. Accordingly, subsequent recurring payments may preclude customer authentication and the customer payment account may directly be debited as per the input related to the SI. The processing of recurring customer payments to the merchant is further explained with reference to a sequence flow diagram in FIG. 6.

Figure 6:
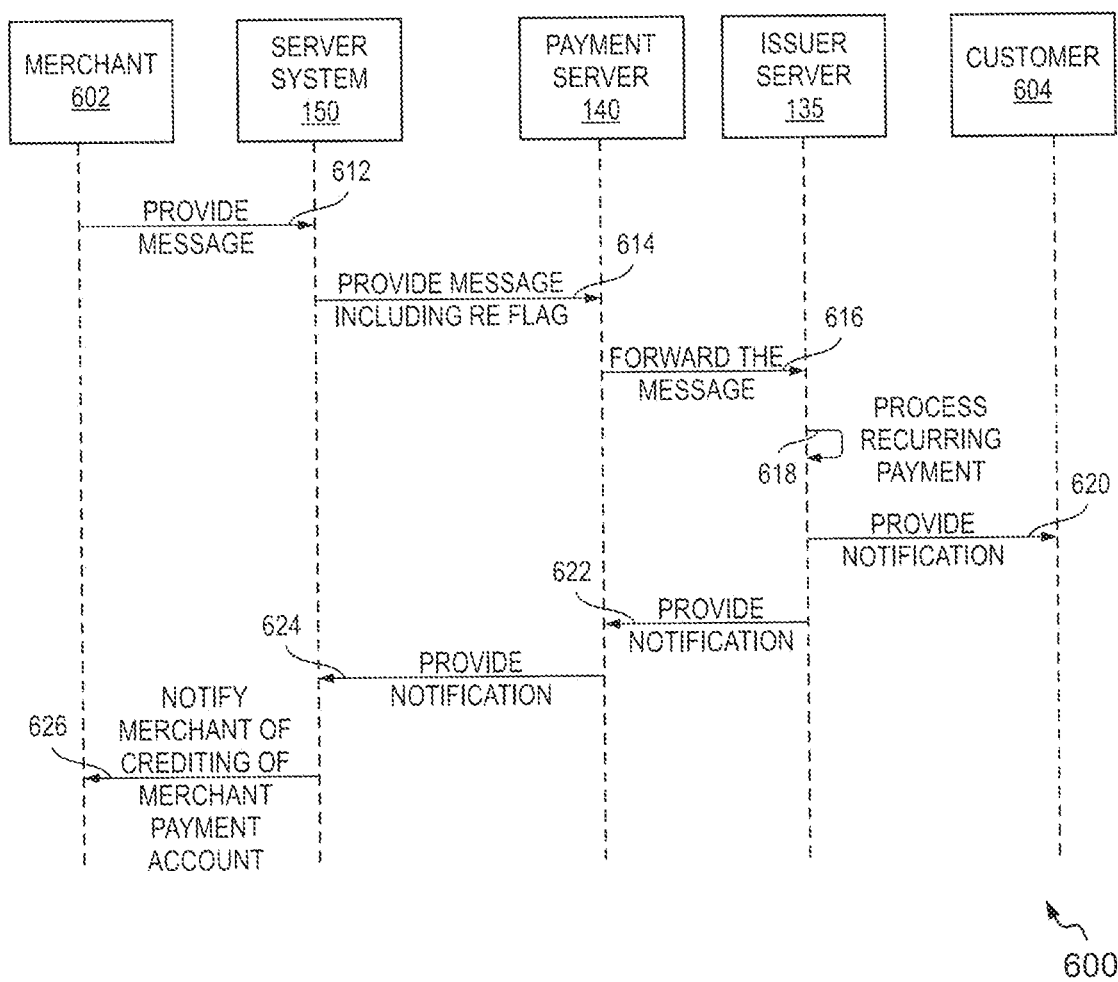
FIG. 6 represents a sequence flow diagram for illustrating a processing of a payment subsequent to the first payment to a merchant, in accordance with an example embodiment of the present disclosure.

FIG. 6 represents a sequence flow diagram 600 for illustrating a processing of a next recurring payment from among the set of recurring payments to a merchant, in accordance with an example embodiment of the present disclosure. More specifically, the sequence flow diagram 600 illustrates a process flow associated with the processing of each payment subsequent to the first payment from the customer to the merchant. The sequence flow diagram 600 starts at 612.

At 612, a merchant 602 provides a message to the server system 150. The server system 150 is explained with reference to FIG. 2. More specifically, the server system 150 corresponds to an acquirer server, i.e. a computer system associated with a merchant bank (i.e., the acquirer). However, it is noted that in some embodiments, the server system 150 may correspond to the payment server such as the payment server 140 explained with reference to FIG. 1. In FIG. 6, the server system 150 is considered to be embodied as the acquirer server 130 associated with the merchant bank.

The merchant 602 may access an application or a Website/online portal associated with the merchant bank using a personal electronic device to provide the message to the server system 150. The message may include data elements DE 108 SE3 SF1-SF5 (explained with reference to FIG. 5E). The message is provided by the merchant 602 on the onset of the date of the scheduled next payment from among the set of recurring payments.

In some embodiments, the message from the merchant 602 may also include a purchase transaction amount associated with the respective recurring payment. As explained with reference to FIG. 2, in some scenarios, the recurring payment may involve minor variance (such as for example, in case of missed daily purchase or increased consumption in a particular period). In such a scenario, the inclusion of the purchase amount in the message provides the flexibility to charge the customer payment account without affecting the SI from a customer 604.

Subsequent to the receipt of the message, the server system 150 verifies the SI information included in the message by comparing the received SI information with the stored information corresponding to the merchant PAN. If the SI information matches, then the server system 150 creates a non-financial message (also referred to hereinafter as the message) with the customer payment account information and SI information (i.e., DE 108 SE3 SF1-SF5). In some embodiments, the SI flag may be replaced by a recurring transaction flag (hereinafter referred to as the RE flag). The server system 150 provides the message including the RE flag to the payment server 140 at 614.

At 616, the payment server 140 may be configured to take note of the RE flag and forward the message to the issuer server 135 by providing the unique identifier along with the RE flag to the issuer server 135. It is noted that the payment server 140 may identify the issuer server 135 based on the customer payment account information included in the message.

At 618, the issuer server 135 identifies the recurring transaction based on the RE flag and the unique identifier. Further, the customer payment account to be debited is also identified based on the customer payment account information included in the message. The issuer server 135 validates the SI related information related to the recurring purchase transaction and processes the recurring payment. More specifically, the issuer server 135 debits the customer payment account by an amount as per the input related to the SI (or as per the amount specified in the message). It is noted that the customer authentication is precluded (based on the successful customer authentication during the first payment) as per the terms and conditions approved by the customer 604 during provisioning of the input related to the SI.

At 620, the issuer server 135 provides a notification of the successful processing of the recurring payment (i.e., the next payment subsequent to the first payment) and debiting of the payment amount from the customer payment account to the customer 604.

At 622, the issuer server 135 notifies the payment server 140 of the successful processing of the recurring payment. The payment server 140 may be configured to record the successful processing of the recurring payment and thereafter at 624, notify the server system 150 of the successful processing of the recurring payment.

At 626, the merchant bank, by using the server system 150, notifies the merchant 602 of the successful processing of the recurring payment and a crediting of the payment into the merchant payment account. The sequence flow diagram 600 ends at 626. It is noted that the sequence flow steps from 612 to 626 may be repeated for each recurring payment from among the set of recurring payments till the end date of the SI as chosen by the customer 604.

A method for facilitating recurring customer payments to a merchant is explained next with reference to FIG. 7.

Figure 7:
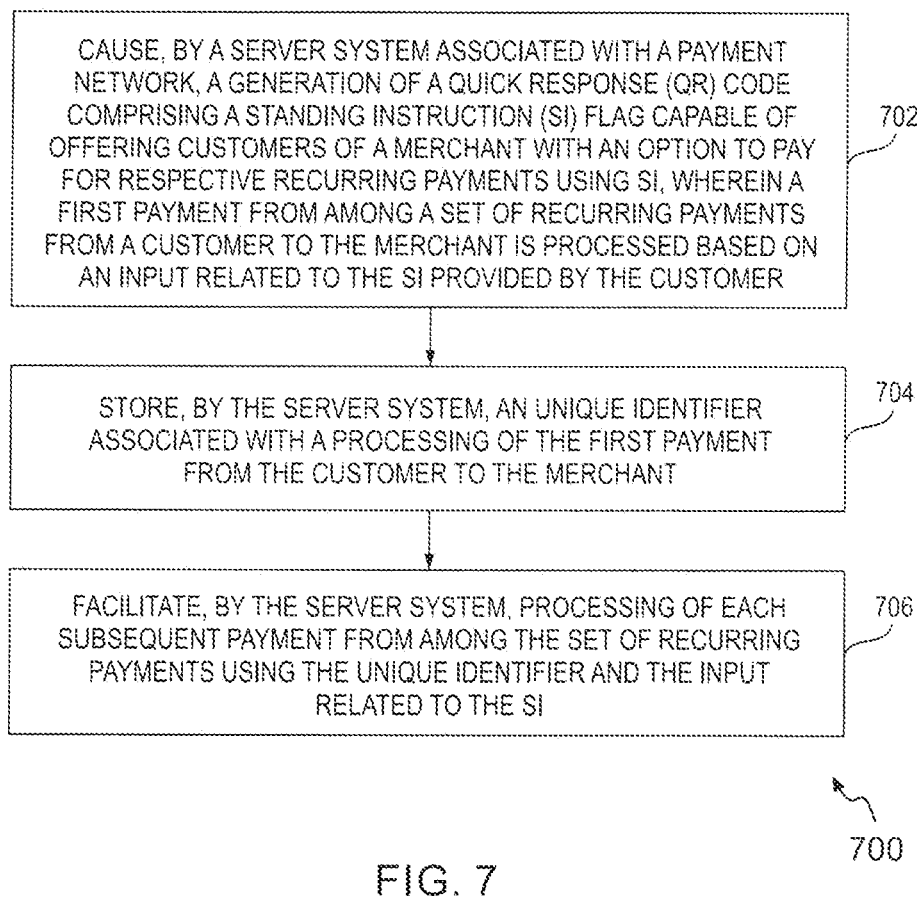
FIG. 7 illustrates a flow diagram of a method for facilitating recurring customer payments to a merchant, in accordance with an example embodiment of the present disclosure.

FIG. 7 illustrates a flow diagram of a method 700 for facilitating recurring customer payments to a merchant, in accordance with an example embodiment of the present disclosure. The method 700 depicted in the flow diagram may be executed by, for example, a server system such as the server system 150 explained with reference to FIGS. 2 and 6. Operations of the flow diagram 700, and combinations of operation in the flow diagram 700, may be implemented by, for example, hardware, firmware, a processor, circuitry, and/or a different device associated with the execution of software that includes one or more computer program instructions.

In one embodiment, the method 700 in the flow diagram may be executed by a server system associated with a merchant bank or a payment server associated with a payment network, such as the Mastercard® payment system interchange network. It is noted that the operations of the method 700 can be described and/or practiced by using other server systems, such as the acquirer server 130 or the issuer server 135 shown in FIG. 1. The method 700 starts at operation 702.

At 702, the method 700 includes causing generation of a QR code including a Standing Instruction (SI) flag capable of offering customers of a merchant with an option to pay for respective recurring payments using SI by a server system associated with a payment network. The term 'causing generation of the QR code' as used herein implies providing an interface, such as an application interface or a Web/Online interface to the merchant for enabling the merchant to request generation of a QR code and thereafter providing a choice to the merchant to include the SI flag in the QR code. An example UI associated with such an interface is shown in FIG. 3. The generated QR code including the SI flag is provided by the merchant to at least one customer. An example provisioning of the QR code to the customer is explained with reference to FIG. 4. It is noted that the generation of QR code is described herein for illustration purposes and in at least some embodiments, the server system may cause generation of any type of machine-readable code (for example, a barcode), which is capable of offering customers of a merchant with an option to pay for respective recurring payments using SI.

A first payment from among a set of recurring payments from a customer to the merchant is processed based on an input related to the SI provided by the customer subsequent to a selection of the option in the QR code by the customer. In one embodiment, the input related to the SI includes a date for debiting a customer payment account for each recurring payment subsequent to the first payment and an end date for the SI. More specifically, subsequent to the selection of the option to pay the merchant for recurring payments using SI, the customer may be requested to input a date on which the customer payment account is to be debited and also an end date for the SI. The customer may further be requested to provide information related to the customer payment account to be debited in relation to the recurring payments to the merchant. In some embodiments, a customer authentication is performed subsequent to the providing the input related to the SI by the customer. A successful authentication may trigger debiting of the customer payment account with an amount specified in the input related to the SI, thereby completing the processing of the first payment from the customer to the merchant based on the input related to the SI. The processing of the first payment based on the input related to the SI is explained with reference to the sequence flow diagram 200 in FIG. 2.

At 704, the method 700 includes storing a unique identifier associated with a processing of the first payment from the customer to the merchant. As explained with reference to FIG. 2, the issuing bank, also referred to herein as the issuer, may be configured to use a payment network (i.e., communicate with the payment server) to notify the merchant bank of the successful processing of the first payment and the transfer of funds to a merchant account. The issuer, or more specifically the issuer server, is configured to generate a unique identifier corresponding to the first payment. The intimation of the merchant in the form of a ISO 0200 financial message including the unique identifier is explained with reference to FIGS. 5D and 5E and is not explained again herein. The unique identifier is configured to facilitate each subsequent recurring payment from the customer to the merchant. In at least some embodiments, the issuer server provides the unique identifier along with the information associated with the SI related input to the merchant bank via the payment server. The merchant bank may be configured to store the unique identifier associated with the first payment and also provide the unique identifier to the merchant.

At 706, the method 700 includes facilitating, by the server system, processing of each subsequent payment from among the set of recurring payments using the unique identifier and the input related to the SI. The term 'facilitating a processing of each subsequent payment' as used herein implies providing of a non-financial message (received from a merchant) along with a recurring transaction (RE) flag to the issuer server for processing of the payment from among the set of recurring payments. The issuer server may be configured to process the recurring payment and notify the customer and the merchant bank of the successful processing of the payment as per the input related to the SI provided by the customer. The processing of each recurring payment subsequent to the first payment based on the input related to the SI is explained with reference to the sequence flow diagram 600 in FIG. 6 and is not explained again herein. The method 700 ends at 706.

Figure 8:
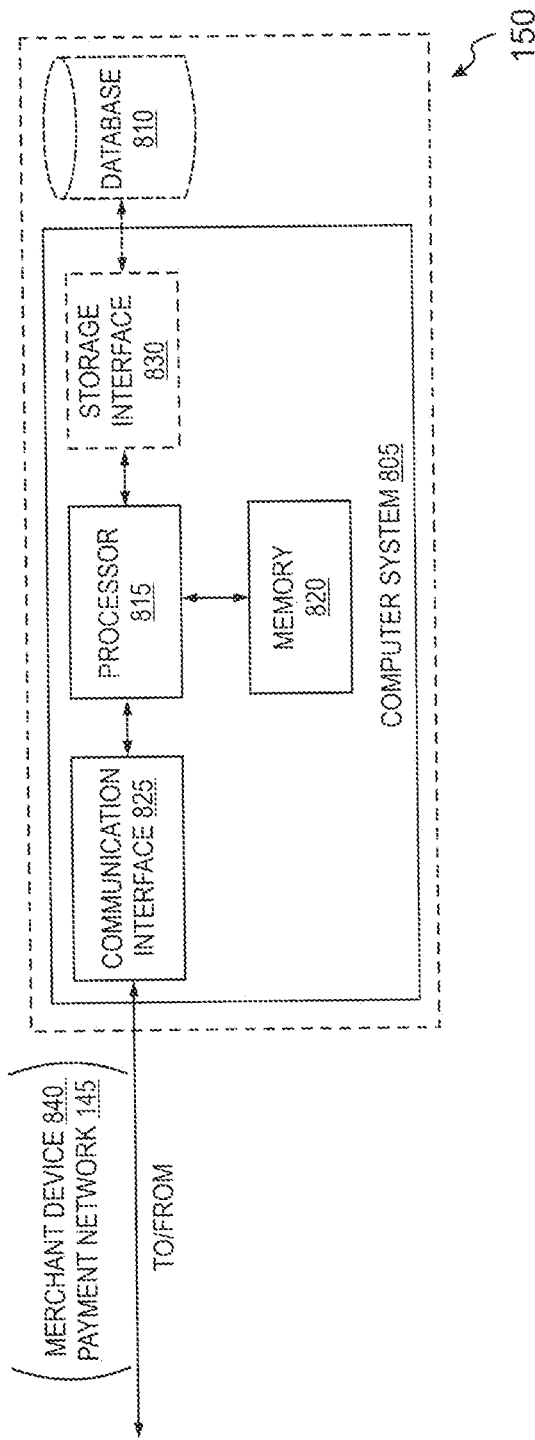
FIG. 8 is a simplified block diagram of a server system of FIG. 2 used for facilitating recurring customer payments to merchants, in accordance with an example embodiment of the present disclosure.

FIG. 8 is a simplified block diagram of a server system 150 used for facilitating recurring customer payments to merchants, in accordance with an example embodiment of the present disclosure. The server system 150 is an example of a server system that is a part of the payment network. Examples of the server system 150 include, but are not limited to, an acquirer server, a payment server, and an issuer server. The server system 150 includes a computer system 805 and a database 810.

The computer system 805 includes at least one processor 815 for executing instructions. Instructions may be stored in, for example, but not limited to, a memory 820. The processor 815 may include one or more processing units (e.g., in a multi-core configuration).

The processor 815 is operatively coupled to a communication interface 825 such that the computer system 805 is capable of communicating with remote entities such as a merchant device 840 (e.g., electronic device associated with a merchant), or any entity within the payment network 145 (shown in FIG. 1). For example, the communication interface 825 may facilitate causing display of an application interface or a Web/online interface on the merchant device 840 for enabling the merchant to request a machine-readable code, such as a QR code, and offer a choice related to the inclusion of the SI flag into the machine-readable code, such as the QR code. The communication interface 825 may also facilitate reception of non-financial messages from the merchants. As explained with reference to FIG. 6, a merchant may provide a message (i.e., a non-financial message) to the server system 150 to initiate the processing of a payment subsequent to the first payment from among the set of recurring payments. The communication interface 825 may also facilitate communication with other entities of the payment network 145, such as with the payment server 140 for example. The payment server 140 may provide the unique identifier and SI related information to the server system 150 subsequent to the successful processing of the first payment. The communication interface 825 may enable the reception of the unique identifier and the SI related information and, further, enable subsequent provisioning of the unique identifier to the merchant for facilitating processing of later purchase transactions.

The processor 815 may also be operatively coupled to the database 810. The database 810 is any computer-operated hardware suitable for storing and/or retrieving data, such as, but not limited to, transaction data generated as part of sales activities conducted over the bankcard network including data relating to merchants, account holders or customers, and purchases. The database 810 also stores merchant data including a merchant identifier that identifies each merchant registered to use the payment network, and instructions for settling transactions including merchant bank account information (e.g., a plurality of payment accounts related to POS terminals associated with merchants). The database 810 is configured to store records of merchants who have chosen to offer their customers with an option to pay for recurring payments using SI. The database 810 is further configured to store the unique identifiers related to the first payments from customers to respective merchant accounts.

The database 810 may include multiple storage units such as hard disks and/or solid-state disks in a redundant array of inexpensive disks (RAID) configuration. The database 810 may include a storage area network (SAN) and/or a network attached storage (NAS) system. In some embodiments, the database 810 is integrated within the computer system 805. For example, the computer system 805 may include one or more hard disk drives as the database 810. In other embodiments, the database 810 is external to the computer system 805 and may be accessed by the computer system 805 using a storage interface 830. The storage interface 830 is any component capable of providing the processor 815 with access to the database 810. The storage interface 830 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 815 with access to the database 810.

The computer system 805 in conjunction with the database 810 is configured to perform various functions as explained with reference to the server system 150 in FIGS. 2 and 6. For example, the processor 815 of the computer system 805 is configured to provide an application or a web service to a plurality of merchants for facilitating generation of the respective QR code including the SI flag. The processor 815 is also configured to receive the messages provided by the merchants and facilitate inclusion of the recurring transaction (RE) flags in respective non-financial messages configured to be provided to the customer banks along with the unique identifiers. Further, the processor 815 provides the unique identifier and the SI related information to the payment server 140 for facilitating processing of the payment (i.e., a payment subsequent to the first payment) to be made to the merchant by a customer.

Figure 9:
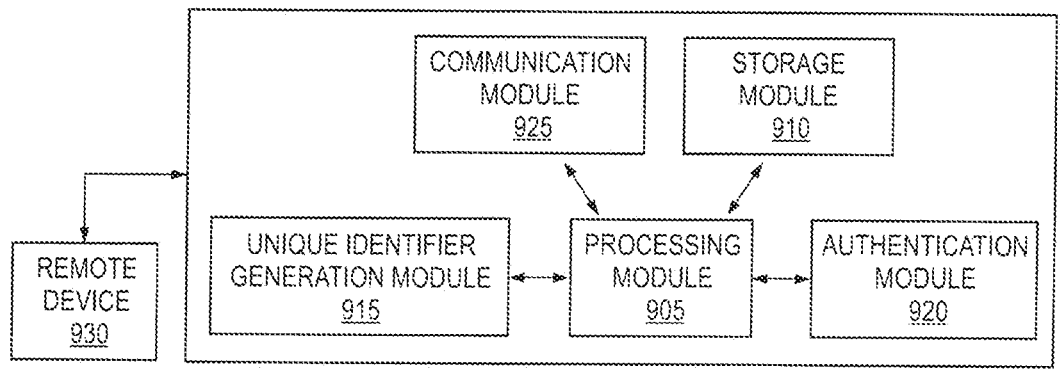
FIG. 9 is a simplified block diagram of an issuer server for facilitating recurring customer payments to a merchant, in accordance with an example embodiment of the present disclosure.

FIG. 9 is a simplified block diagram of an issuer server 900 for facilitating recurring customer payments to a merchant, in accordance with an example embodiment of the present disclosure. The issuer server 900 is an example of the issuer server 135 of FIG. 1 or may be embodied in the issuer server 135. The issuer server 900 is associated with an issuer bank/issuer, in which a customer may have an account, which provides an option to the customer to pay a merchant for recurring payments using Standing Instruction (SI). The issuer server 900 includes a processing module 905 operatively coupled to a storage module 910, a unique identifier generation module 915, an authentication module 920, and a communication module 925. The components of the issuer server 900 provided herein may not be exhaustive, and that the issuer server 900 may include more or fewer components than that of depicted in FIG. 9. Further, two or more components may be embodied in one single component, and/or one component may be configured using multiple sub-components to achieve the desired functionalities. Some components of the issuer server 900 may be configured using hardware elements, software elements, firmware elements, and/or a combination thereof.

The storage module 910 is configured to store machine executable instructions to be accessed by the processing module 905. Additionally, the storage module 910 stores information related to, contact information of the customer, bank account number (i.e., customer payment account number), bank identifier codes (BICs), payment card details, internet banking information, PIN, mobile personal identification number (MPIN) for mobile banking, and the like. This information is retrieved by the processing module 905 for cross-verification during payment transactions.

The processing module 905, in conjunction with the authentication module 920, is configured to validate the customer payment account information such as the payment card information, the PIN (e.g., whether the four-digit numeric code matches the PIN issued by the issuer), and the like. The authentication module 920 is also configured to perform authentication of customers using OTP or any such 3DS means. Upon successful authentication only, the processing module 905 is configured to process the first payment from the customer payment account to the merchant. It is noted that the customer authentication may be precluded for payments subsequent to the first payment. The unique identifier generation module 915 is configured to generate a financial message such as the ISO 0200 message including the unique identifier explained with reference to FIGS. 5D and 5E.

The processing module 905 is further configured to communicate with one or more remote devices such as a remote device 930 using the communication module 925 over a network such as the network 155 or the payment network 145 of FIG. 1. The examples of the remote device 930 include a customer device, the payment server 140, the acquirer server 130, other computing systems of the payment network 145 and the like. The processing module 905 may be configured to utilize the communication module 925 to provide the financial message including the unique identifier to the payment server 140 for subsequent forwarding of the unique identifier associated with the first payment to the merchant bank. The communication module 925 may also facilitate reception of the non-financial message including the RE flag from the payment server 140. The communication module 925 is capable of facilitating such operative communication with the remote devices using API (Application Program Interface) calls.

Figure 10:
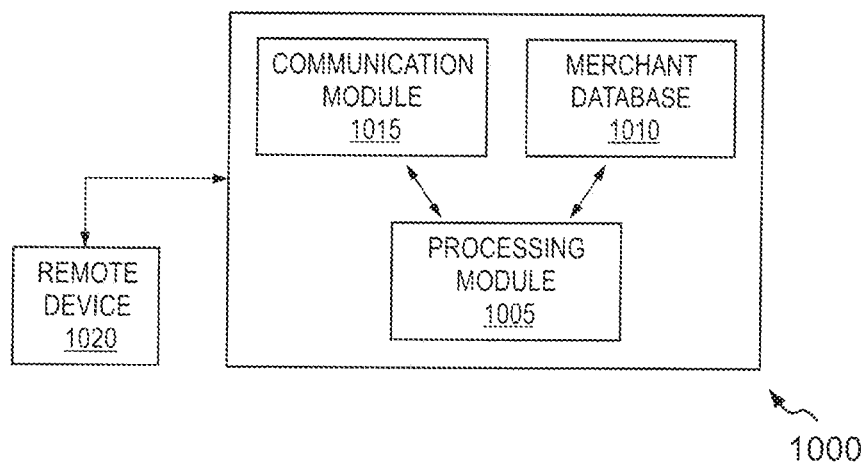
FIG. 10 is a simplified block diagram of an acquirer server used for facilitating recurring customer payments to the merchants, in accordance with an example embodiment of the present disclosure.

FIG. 10 is a simplified block diagram of an acquirer server 1000 used for facilitating recurring customer payments to the merchants, in accordance with an example embodiment of the present disclosure. The acquirer server 1000 is associated with the acquirer bank of a merchant where the merchant has established an account to accept payment from customers, such as recurring payments using SI. The acquirer server 1000 is an example of the acquirer server 130 of FIG. 1 or may be embodied in the acquirer server 130. In at least some embodiments, the acquirer server 1000 is an example of the server system 150 explained with reference to FIGS. 2 and 6.

The acquirer server 1000 includes a processing module 1005 communicably coupled to a merchant database 1010 and a communication module 1015. The components of the acquirer server 1000 provided herein may not be exhaustive, and that the acquirer server 1000 may include more or fewer components than that of depicted in FIG. 10. Further, two or more components may be embodied in one single component, and/or one component may be configured using multiple sub-components to achieve the desired functionalities. Some components of the acquirer server 1000 may be configured using hardware elements, software elements, firmware elements, and/or a combination thereof.

The merchant database 1010 includes data related to each merchant, such as, but not limited to, a merchant primary account number (PAN), a merchant name, a merchant category code (MCC), a merchant city, a merchant postal code, a merchant brand name, a merchant ID, and the like. The processing module 1005 is configured to use the merchant ID to identify the merchant during the normal processing of payment transactions, adjustments, chargebacks, end-of-month fees, and so forth. The merchant ID is different than other merchant account numbers, particularly those that identify merchants to the equipment (e.g., the POS terminals or any other merchant electronic devices) they use for processing transactions. A merchant with a single merchant processing account number may use several terminals at one location, resulting in one merchant ID and several terminal identification numbers (TIDs). The processing module 1005 may be configured to store and update such merchant information in the merchant database 1010 for later retrieval.

In an embodiment, the communication module 1015 is capable of facilitating operative communication with a remote device 1020 (e.g., the merchant device 840 and/or the payment server 140) using API calls. The communication may be achieved over a communication network, such as the network 155.

The processing module 1005 in conjunction with the communication module 1015 may be configured to cause provisioning of an interface, such as an application interface and/or online/Web interface. Further, the processing module 1005 may be configured to process the merchant input and generate the QR code. For example, the processing module 1005 may be configured to process the merchant input related to the request for the generation of the QR code and/or the choice of including the SI flag in the QR code and generate the QR code accordingly. The processing module 1005 in conjunction with the communication module 1015 may also be configured to cause provisioning of the QR code to the merchant.

In some embodiments, the processing module 1005 may be configured to receive the non-financial message from the merchant for initiating a recurring payment. The processing module 1005 may identify the merchant and the SI related transaction using the SI flag and the unique identifier (i.e., an identifier associated with a first payment from a customer to the merchant executed earlier) in the notification message. The processing module 1005 may further be configured to generate a non-financial message including a RE flag and provide the non-financial message along with the unique identifier to facilitate processing of the recurring payment from the customer to the merchant.

In some embodiments, the processing module 1005 is configured to receive the debited transaction amount from the payment server 140 or the issuer server 135 (or the issuer server 900) using the communication module 1015. Thereafter, the processing module 1005 may retrieve merchant PAN from the merchant database 1010 to credit the transaction amount in the acquirer account of the merchant. Further, the processing module 1005 may be configured to send the transaction status to the merchant device 840.

Figure 11:
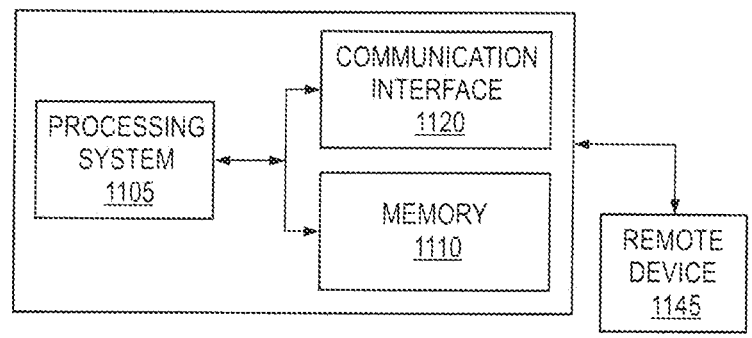
FIG. 11 is a simplified block diagram of a payment server used for facilitating recurring customer payments to merchants, in accordance with an example embodiment of the present disclosure.

FIG. 11 is a simplified block diagram of a payment server 1100 used for facilitating recurring customer payments to merchants, in accordance with an example embodiment of the present disclosure. The payment server 1100 may correspond to the payment server 140 of FIG. 1. As explained with reference to FIG. 1, the payment server 140 is associated with the payment network 145. The payment network 145 may be used by the issuer server 900 and the acquirer server 1000 as a payment interchange network. Examples of payment interchange network include, but not limited to, Mastercard® payment system interchange network. In at least some embodiments, the payment server 1100 is an example of the server system 150 explained with reference to FIGS. 2 and 6.

The payment server 1100 includes a processing system 1105 configured to extract programming instructions from a memory 1110 to provide various features of the present disclosure. The components of the payment server 1100 provided herein may not be exhaustive, and that the payment server 1100 may include more or fewer components than that of depicted in FIG. 11. Further, two or more components may be embodied in one single component, and/or one component may be configured using multiple sub-components to achieve the desired functionalities. Some components of the payment server 1100 may be configured using hardware elements, software elements, firmware elements, and/or a combination thereof.

In one embodiment, the processing system 1105 in operable communication with an acquirer server associated with a merchant bank may be configured to cause provisioning of an interface, such as an application interface and/or online/Web interface via a communication interface 1120. Further, the processing system 1105 may be configured to process the merchant input and generate the QR code. For example, the processing system 1105 may be configured to process the merchant input related to the request for the generation of the QR code and/or the choice of including the SI flag in the QR code and generate the QR code accordingly. The processing system 1105 in conjunction with the communication interface 1120 may also be configured to cause provisioning of the QR code to the merchant.

In some embodiments, the processing system 1105 may be configured to receive a message of the successful processing of the first payment from a customer to a merchant from the issuer server 900 (explained with reference to FIG. 9) associated with the customer bank (i.e., the issuer) and store the unique identifier in the memory 1110. The processing system 1105 may further be configured to notify the acquirer server 1000 of the successful processing of the first payment and also facilitate transfer of the transaction amount from the customer payment account to the merchant payment account.

In some embodiments, the processing system 1105 may receive a non-financial message from the acquirer server 1000. The non-financial message may include a RE flag (indicative of a recurring payment transaction) and a unique identifier associated with the first payment. The processing system 1105 may be configured to identify the customer and the customer bank based on the unique identifier by comparing the unique identifier with a stored copy in the memory 1110 and accordingly provide the RE flag and the unique identifier to the issuer server 900 for processing the payment from among the set of recurring payments from the customer to the merchant. In an embodiment, a remote device 1145 may correspond to the issuer server 900, the acquirer server 1000, the merchant device 840, or any other entity on the payment network 145.

Figure 12:
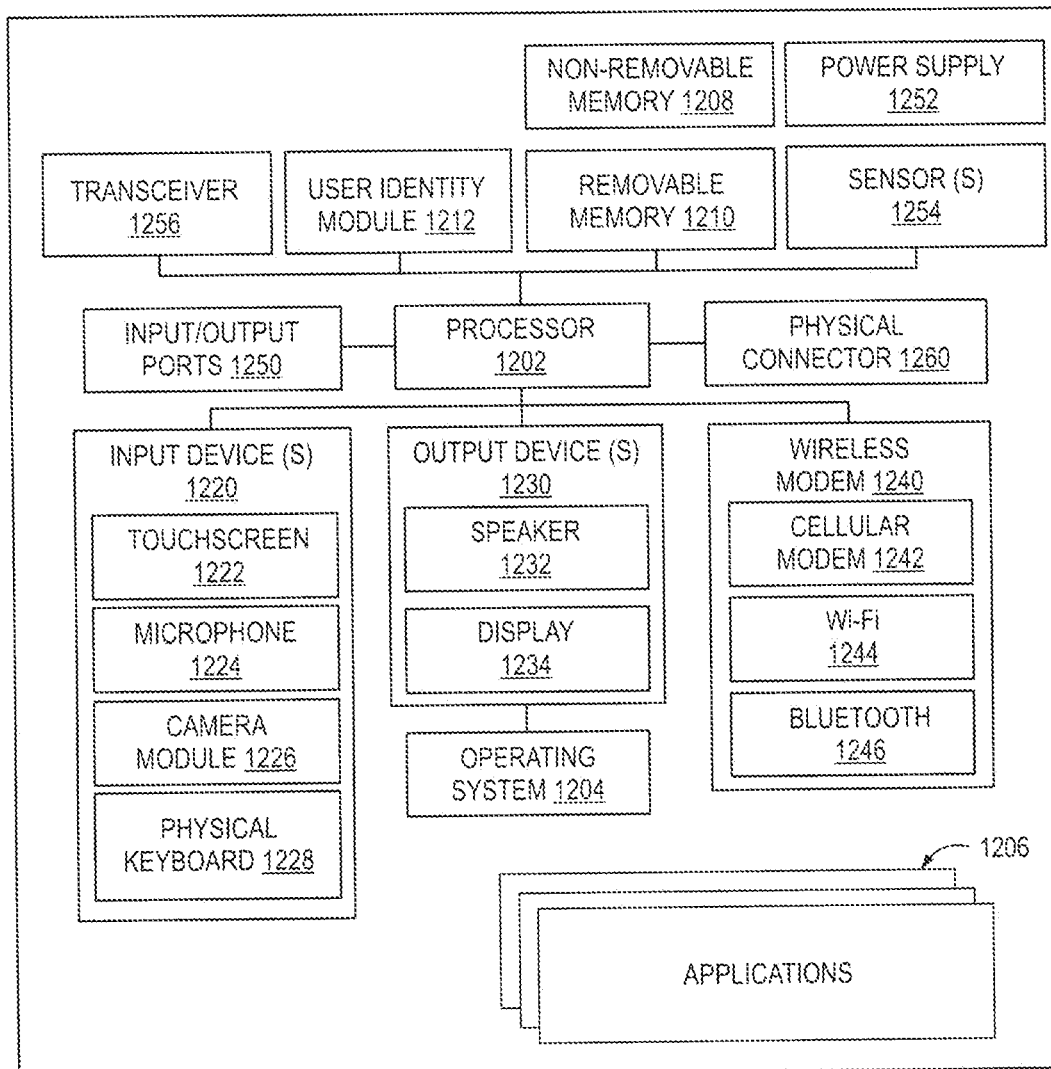
FIG. 12 shows a simplified block diagram of an electronic device capable of implementing at least some embodiments of the present disclosure.

FIG. 12 shows simplified block diagram of an electronic device 1200 capable of implementing the various embodiments of the present disclosure. For example, the electronic device 1200 may correspond to a merchant device or a customer device. The electronic device 1200 is depicted to include one or more applications 1206.

It should be understood that the electronic device 1200 as illustrated and hereinafter described is merely illustrative of one type of device and should not be taken to limit the scope of the embodiments. As such, it should be appreciated that at least some of the components described below in connection with that the electronic device 1200 may be optional and thus in an example embodiment may include more, less or different components than those described in connection with the example embodiment of the FIG. 12.

The illustrated electronic device 1200 includes a controller or a processor 1202 (e.g., a signal processor, microprocessor, ASIC, or other control and processing logic circuitry) for performing such tasks as signal coding, data processing, image processing, input/output processing, power control, and/or other functions. An operating system 1204 controls the allocation and usage of the components of the electronic device 1200 and support for one or more payment application programs (see, the applications 1206), that implements one or more of the innovative features, such as providing an interface for requesting generation of the QR code, or for providing a choice related to choosing to include a SI flag in the QR code. The payment application program may also facilitate scanning of the QR code and enable providing of an input related to the SI to facilitate recurring customer payments to a merchant, as described herein. In addition, the applications 1206 may include common mobile computing applications (e.g., telephony applications, email applications, calendars, contact managers, web browsers, and messaging applications) or any other computing application.

The illustrated electronic device 1200 includes one or more memory components, for example, a non-removable memory 1208 and/or a removable memory 1210. The non-removable memory 1208 and/or the removable memory 1210 may be collectively known as database in an embodiment. The non-removable memory 1208 can include RAM, ROM, flash memory, a hard disk, or other well-known memory storage technologies. The removable memory 1210 can include flash memory, smart cards, or a Subscriber Identity Module (SIM). The one or more memory components can be used for storing data and/or code for running the operating system 1204 and the applications 1206. The electronic device 1200 may further include a user identity module (UIM) 1212. The UIM 1212 may be a memory device having a processor built in. The UIM 1212 may include, for example, a subscriber identity module (SIM), a universal integrated circuit card (UICC), a universal subscriber identity module (USIM), a removable user identity module (R-UIM), or any other smart card. The UIM 1212 typically stores information elements related to a mobile subscriber. The UIM 1212 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The electronic device 1200 can support one or more input devices 1220 and one or more output devices 1230. Examples of the input devices 1220 may include, but are not limited to, a touch screen/a display screen 1222 (e.g., capable of capturing finger tap inputs, finger gesture inputs, multi-finger tap inputs, multi-finger gesture inputs, or keystroke inputs from a virtual keyboard or keypad), a microphone 1224 (e.g., capable of capturing voice input), a camera module 1226 (e.g., capable of capturing still picture images and/or video images) and a physical keyboard 1228. Examples of the output devices 1230 may include but are not limited to a speaker 1232 and a display 1234. Other possible output devices can include piezoelectric or other haptic output devices. Some devices can serve more than one input/output function. For example, the touch screen 1222 and the display 1234 can be combined into a single input/output device.

A wireless modem 1240 can be coupled to one or more antennas (not shown in the FIG. 12) and can support two-way communications between the processor 1202 and external devices, as is well understood in the art. The wireless modem 1240 is shown generically and can include, for example, a cellular modem 1242 for communicating at long range with the mobile communication network, a Wi-Fi compatible modem 1244 for communicating at short range with an external Bluetooth-equipped device or a local wireless data network or router, and/or a Bluetooth-compatible modem 1246. The wireless modem 1240 is typically configured for communication with one or more cellular networks, such as a GSM network for data and voice communications within a single cellular network, between cellular networks, or between the electronic device 1200 and a public switched telephone network (PSTN).

The electronic device 1200 can further include one or more input/output ports 1250, a power supply 1252, one or more sensors 1254 for example, an accelerometer, a gyroscope, a compass, or an infrared proximity sensor for detecting the orientation or motion of the electronic device 1200 and biometric sensors for scanning biometric identity of an authorized user, a transceiver 1256 (for wirelessly transmitting analog or digital signals) and/or a physical connector 1260, which can be a USB port, IEEE 1294 (FireWire) port, and/or RS-232 port. The illustrated components are not required or all-inclusive, as any of the components shown can be deleted and other components can be added.

The disclosed embodiments with reference to FIGS. 1 to 6, or one or more operations of the flow diagram 700 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Although the disclosure has been described with reference to specific exemplary embodiments, it is noted that various modifications and changes may be made to these embodiments without departing from the broad spirit and scope of the disclosure. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the server system 150 its various components such as the computer system 805 and the database 810 may be enabled using software and/or using transistors, logic gates, and electrical circuits (for example, integrated circuit circuitry such as ASIC circuitry). Various embodiments of the disclosure may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-RA/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Various embodiments of the disclosure, as discussed above, may be practiced with steps and/or operations in a different order, and/or with hardware elements in configurations, which are different than those which, are disclosed. Therefore, although the disclosure has been described based upon these exemplary embodiments, it is noted that certain modifications, variations, and alternative constructions may be apparent and well within the spirit and scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A computer-implemented method, the method comprising:
   receiving, by a server system associated with a payment network from a merchant computing device associated with a merchant, a request for a Quick Response (QR) code, wherein the request indicates at least one frequency at which the merchant wishes to offer an option for recurring payments to a plurality of customers of the merchant;
   in response to receiving the request, causing, by the server system, a generation of the QR code comprising a Standing Instruction (SI) flag, wherein the generated QR code is provided by the merchant to the plurality of customers, the QR code encoded for scanning by a payment application installed on respective personal electronic devices of the plurality of customers, and wherein the SI flag included in a scan of the QR code is configured to cause a user interface of the payment application to present a selectable SI option to make recurring payments to the merchant at the at least one frequency;
   receiving, by the server system from an issuer server in communication with the payment application, a message including (i) a first payment of the respective recurring payments to the merchant and (ii) a unique identifier associated with processing of the first payment, the message generated in response to a selection of the SI option in connection with the scan of the QR code by the respective personal electronic device;
   storing, by the server system, the unique identifier and SI information associated with the selected SI option;
   forwarding, by the server system, the unique identifier and the SI information to the merchant computing device associated with the merchant, wherein the SI information enables the merchant computing device to initiate each subsequent payment of the recurring payments;
   receiving, by the server system, a recurring payment message from the merchant computing device, the recurring payment message including the unique identifier and the SI information;
   verifying, by the server system, the recurring payment message by comparing the received SI information to the stored SI information; and
   transmitting, by the server system to the issuer server associated with an issuing bank, a subsequent message including the unique identifier and a recurring transaction (RE) flag indicating that a subsequent payment is one of the respective recurring payments.

2. The method according to claim 1, further comprising:
   responsive to the request, providing by the server system, a choice to the merchant to include the SI flag in the QR code; and
   in response to an acceptance of the choice by the merchant, requesting the merchant by the server system, to choose the at least one frequency of scheduling recurring payments to be offered to the plurality of customers, wherein the QR code comprising the SI flag is generated subsequent to a receipt of a merchant input related to the at least one frequency.

3. The method according to claim 1, wherein the generated QR code is included by the merchant in purchase transaction bills provided to the plurality of customers for offering the plurality of customers with the option to pay the merchant for the respective recurring payments using the SI option.

4. The method according to claim 1, wherein the scan of the QR code is configured to further cause the user interface to present one or more customer payment accounts to pay the merchant using the SI option.

5. The method according to claim 4, wherein the selection of the SI option causes the user interface to present a date request to provide a recurring date for debiting a customer payment account of the one or more customer payment accounts for each subsequent payment of the respective recurring payments and an end date for debiting the customer payment account.

6. The method according to claim 5, wherein the input the recurring payment message is received at an onset of the date each month, and wherein the recurring payment message causes the customer payment account to be debited in relation to each subsequent payment of the respective recurring payments to the merchant.

7. The method according to claim 5, further comprising:
causing, by the server system, a provisioning of the recurring payment message to the issuing bank associated with the customer payment account to facilitate processing of the subsequent payment.

8. The method according to claim 1, further comprising:
performing an authentication of a customer of the plurality of customers subsequent to receiving the message generated in response to the selection of the SI option in connection with the scan of the QR code by the respective personal electronic device of the customer, wherein the authentication comprises seeking customer permission for processing each subsequent payment of the respective recurring payments based on the authentication for the first payment;
facilitating processing of the first payment subsequent to a successful authentication of the customer; and
generating the unique identifier corresponding to the processing of the first payment, wherein the unique identifier is configured to facilitate each subsequent payment from the customer to the merchant.

9. The method according to claim 1, wherein the recurring payment message includes a purchase transaction amount associated with the subsequent payment.

10. A server system in a payment network, the server system comprising:
a memory comprising stored instructions; and
at least one processor communicably coupled to the memory, the at least one processor configured to execute the stored instructions to cause the server system to at least:
receive, from a merchant computing device associated with a merchant, a request for a machine-readable code wherein the request indicates at least one frequency at which the merchant wishes to offer an option for recurring payments to a plurality of customers of the merchant;
in response to receiving the request, cause a generation of the machine-readable code comprising a Standing Instruction (SI) flag, wherein the generated machine-readable code is provided by the merchant to the plurality of customers, the machine-readable code encoded for scanning by a payment application installed on respective personal electronic devices of the plurality of customers, and wherein the SI flag included in a scan of the machine-readable code is configured to cause a user interface of the payment application to present a selectable SI option to make recurring payments to the merchant at the at least one frequency;
receive, from an issuer server in communication with the payment application, a message including (i) a first payment of the respective recurring payments to the merchant and (ii) a unique identifier associated with processing of the first payment, the message generated in response to a selection of the SI option in connection with the scan of the machine-readable code by the respective personal electronic device;
store the unique identifier and SI information associated with the selected SI option;
forward the unique identifier and the SI information to the merchant computing device associated with the merchant, wherein the SI information enables the merchant computing device to initiate each subsequent payment of the recurring payments;
receive a recurring payment message from the merchant computing device, the recurring payment message including the unique identifier and the SI information;
verify the recurring payment message by comparing the received SI information to the stored SI information; and
transmit, to the issuer server associated with an issuing bank, a subsequent message including the unique identifier and a recurring transaction (RE) flag indicating that a subsequent payment is one of the respective recurring payments.

11. The server system according to claim 10, wherein the server system is further caused to:
responsive to the request, provide a choice to the merchant to include the SI flag in the machine-readable code; and
in response to an acceptance of the choice by the merchant, request the merchant by the server system, to choose the at least one frequency of scheduling recurring payments to be offered to the plurality of customers, wherein the machine-readable code comprising the SI flag is generated subsequent to a receipt of a merchant input related to the at least one frequency.

12. The server system according to claim 10, wherein the scan of the machine-readable code is configured to further cause the user interface to present one or more customer payment accounts to pay the merchant using the SI option, and wherein the machine-readable code corresponds to one of a quick response (QR) code and a bar code.

13. The server system according to claim 12, wherein the selection of the SI option causes the user interface to present a date request to provide a date for debiting a customer payment account of the one or more customer payment accounts for each subsequent payment of the respective recurring payments and an end date for debiting the customer payment account.

14. The server system according to claim 13, wherein the recurring payment message is received at an onset of the date each month, and wherein the recurring payment message causes the customer payment account to be debited in relation to each subsequent payment of the respective recurring payments to the merchant.

15. The server system according to claim 13, wherein the server system is further caused to:
cause a provisioning of the recurring payment message to the issuing bank associated with the customer payment account to facilitate the processing of the subsequent payment.

16. A computer-implemented method, the method comprising:
receiving, by an acquirer server associated with a payment network from a merchant computing device associated with a merchant, a request for a Quick Response (QR) code wherein the request indicates at least one frequency at which the merchant wishes to offer an option for recurring payments to a plurality of customers of the merchant;
in response to receiving the request, generating, by the acquirer server, the QR code comprising a Standing Instruction (SI) flag, wherein the generated QR code is provided by the merchant to the plurality of customers, the QR code encoded for scanning by a payment application installed on respective personal electronic devices of the plurality of customers, and wherein the SI flag included in a scan of the QR code is configured to cause a user interface of the payment application to present a selectable SI option to make recurring payments to the merchant at the at least one frequency;

receiving, by the acquirer server, from an issuer server in communication with the payment application, a message including (i) a first payment of the respective recurring payments to the merchant and (ii) a unique identifier associated with processing of the first payment, the message generated in response to a selection of the SI option in connection with the scan of the QR code by the respective personal electronic device;

storing, by the acquirer server, the unique identifier and SI information associated with the selected SI option;

forwarding, by the acquirer server, the unique identifier and the SI information to the merchant computing device associated with the merchant, wherein the SI information enables the merchant computing device to initiate each subsequent payment of the recurring payments;

receiving, by the acquirer server, a recurring payment message from the merchant computing device, the recurring payment message including the unique identifier and the SI information;

verifying, by the acquirer server, the recurring payment message by comparing the received SI information to the stored SI information; and transmitting, by the acquirer server, a subsequent message to the issuer server associated with an issuing bank, the subsequent message including the unique identifier and a recurring transaction (RE) flag indicating that a subsequent payment is one of the respective recurring payments.

17. The method according to claim 16, further comprising:

responsive to the request, providing by the acquirer server, a choice to the merchant to include the SI flag in the QR code; and in response to an acceptance of the choice by the merchant, requesting the merchant by the acquirer server, to choose the at least one frequency of scheduling recurring payments to be offered to the plurality of customers, wherein the QR code comprising the SI flag is generated subsequent to a receipt of a merchant input related to the at least one frequency.

18. The method according to claim 16, wherein the selection of the SI option causes the user interface to present a date request to provide a date for debiting a customer payment account of one or more customer payment accounts presented on the user interface, the customer payment account debited for paying each subsequent payment of the respective recurring payments and an end date for debiting the customer payment account.

* * * * *